US012380791B2

(12) United States Patent
Gupta et al.

(10) Patent No.: US 12,380,791 B2
(45) Date of Patent: Aug. 5, 2025

(54) SPACE-SAVING EQUIPMENT PANEL STATUS INDICATOR

(71) Applicant: CIENA CORPORATION, Hanover, MD (US)

(72) Inventors: Chander Prakash Gupta, Gurugram (IN); Sardeep Heda, Udaipur (IN); Ranjeet Chaurasiya, Gurugram (IN); Rampratap Mahawar, Dausa (IN)

(73) Assignee: CIENA CORPORATION, Hanover, MD (US)

( * ) Notice: Subject to any disclaimer, the term of this patent is extended or adjusted under 35 U.S.C. 154(b) by 116 days.

(21) Appl. No.: 18/320,611

(22) Filed: May 19, 2023

(65) Prior Publication Data

US 2024/0312332 A1 Sep. 19, 2024

(51) Int. Cl.

*B60R 1/12* (2006.01)
*G08B 21/18* (2006.01)
*H05B 45/20* (2020.01)
*H05B 45/30* (2020.01)

(52) U.S. Cl.

CPC ............. *G08B 21/18* (2013.01); *H05B 45/20* (2020.01); *H05B 45/30* (2020.01)

(58) Field of Classification Search

USPC ... 340/815.4, 815.45, 815.5, 815.55, 815.65, 340/855.3, 870.26, 870.27, 911–913
See application file for complete search history.

(56) References Cited

U.S. PATENT DOCUMENTS

| | | | | |
|---|---|---|---|---|
| 6,122,065 | A * | 9/2000 | Gauthier | G01N 33/46 356/394 |
| 6,655,988 | B1 | 12/2003 | Simmons et al. | |
| 6,817,890 | B1 * | 11/2004 | Schindler | H04Q 1/136 439/490 |
| 7,586,407 | B2 | 9/2009 | Huang et al. | |
| 8,103,801 | B1 | 1/2012 | Sardella et al. | |
| 9,734,676 | B2 | 8/2017 | Apcar | |
| 10,042,135 | B2 | 8/2018 | Murray et al. | |
| 10,264,332 | B1 | 4/2019 | Sable et al. | |
| 2003/0137513 | A1 | 7/2003 | Yin et al. | |
| 2005/0071689 | A1 * | 3/2005 | Coward | H04Q 1/03 713/300 |
| 2005/0254821 | A1 | 11/2005 | Theodoras | |
| 2008/0030362 | A1 | 2/2008 | Huang et al. | |
| 2010/0164736 | A1 | 7/2010 | Byers et al. | |

(Continued)

*Primary Examiner* — Daniel Previl

(74) *Attorney, Agent, or Firm* — Guntin & Gust, PLC; Atanu Das

(57) ABSTRACT

Aspects of the subject disclosure may include, for example, a process for providing status indication, that includes receiving a control signal at a proximal end of an elongated flexible circuit assembly including a distal portion attached to and extending along at least a portion of an elongated, panel-facing edge of a planar circuit board. The process further includes directing the control signal around a bent portion of the elongated flexible circuit assembly and to a number of visual status indicators distributed along at least a distal end of the elongated flexible circuit assembly, wherein at least a portion of the number of visual status indicators is actuated, responsive to the control signal, to provide a visual indication of a status of equipment supported by the planar circuit board. Other embodiments are disclosed.

20 Claims, 12 Drawing Sheets

(56) References Cited

U.S. PATENT DOCUMENTS

| | | | | |
|---|---|---|---|---|
| 2010/0254096 | A1* | 10/2010 | Kim | G06F 1/185 361/737 |
| 2011/0159743 | A1* | 6/2011 | Johnescu | H01R 12/585 29/874 |
| 2013/0241739 | A1 | 9/2013 | Zou et al. | |
| 2014/0013093 | A1* | 1/2014 | Alshinnawi | G06F 1/183 713/2 |
| 2014/0056560 | A1* | 2/2014 | McColloch | G02B 6/423 29/466 |
| 2018/0077472 | A1 | 3/2018 | Raza et al. | |

* cited by examiner

Section B-B'

200

240

300

500

Section C-C'
650

600

Section D-D'

750

700

850

1000

1100

SPACE-SAVING EQUIPMENT PANEL STATUS INDICATOR

CROSS-REFERENCE TO RELATED APPLICATIONS

This application claims priority under 35 U.S.C. § 1.119 to Indian patent application Ser. No. 202311016582, filed on Mar. 16, 2023. All sections of the aforementioned application(s) and/or patent(s) are incorporated herein by reference in their entirety.

FIELD OF THE DISCLOSURE

The subject disclosure relates to a space-saving equipment panel status indicator.

BACKGROUND

Modern computing systems often include various network devices to facilitate network-based communications. For example, network devices such as switches and routers may be interconnected with each other and various networks to support such communications.

Individual network devices may include display panels to provide status information that may be monitored by a user. Frequently, these display panels are implemented with light emitting diodes (LEDs) configured to display the status of particular parameters of the device or the network system. For example, a first set of LEDs may be provided to indicate the operational status of various ports of the network device, and a second set of LEDs may be provided to indicate various configuration and/or system-related information. Frequently, such network devices are implemented in compact hardware enclosures having relatively small form factors that can facilitate convenient grouping of multiple devices, e.g., in equipment racks and/or cabinets of a data center.

BRIEF DESCRIPTION OF THE DRAWINGS

Reference will now be made to the accompanying drawings, which are not necessarily drawn to scale, and wherein.

DETAILED DESCRIPTION

Figure 1C:
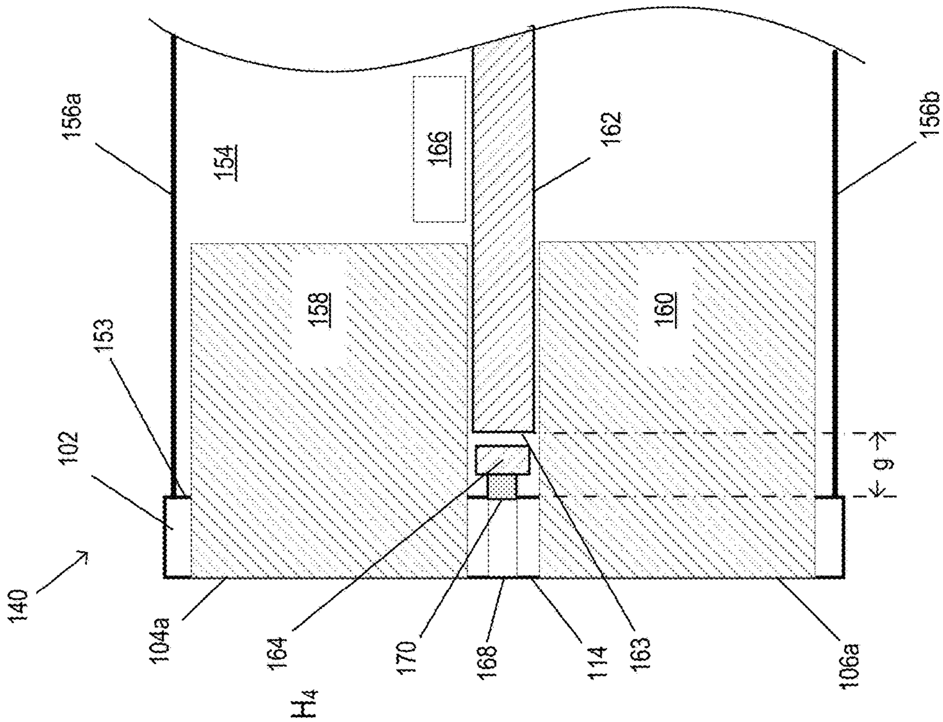
FIG. 1C is a section view illustrating a front portion of the example electronic device illustrated in FIG. 1A in accordance with various aspects described herein.

The subject disclosure describes, among other things, illustrative embodiments of repeating, conductive patterns configured for coupling to a thermal source to transfer heat away from the thermal source according to a desired directionality. Repeating conductive patterns are thermally coupled to each other to combine the desired directionality of each of the patterns to obtain a distributed directionality transferring heat away from the thermal source to reduce any unwanted localized concentration of the heat. Other embodiments are described in the subject disclosure.

One or more aspects of the subject disclosure include an equipment panel indicator assembly. The equipment panel indicator assembly includes an elongated circuit board extending between a proximal end and a distal end, wherein the elongated circuit board includes and an electrical interface at the proximal end. The elongated circuit board further includes an outer surface having length and width dimensions, such that the length dimension that is substantially greater than the width dimension. The indicator assembly further includes a number of electrically actuated indicators arranged along the outer surface and distributed along at least a proximal portion of the length dimension. The indicator assembly further includes a number of conductive traces extending between the electrical interface and at least a portion of the number of electrically actuated indicators. The indicator assembly further includes a fastening enhancement feature, mechanism and/or device positioned along at least a portion of an inner surface of the elongated circuit board, wherein the fastening enhancement feature is configured for attachment to an edge of a planar structure, such as a printed circuit board.

One or more aspects of the subject disclosure include a process for providing status indication. The process includes receiving a control signal at a proximal end of an elongated flexible circuit assembly including a distal portion attached to and extending along at least a portion of an elongated, panel-facing edge of a planar circuit board. The process further includes directing the control signal around a bent portion of the elongated flexible circuit assembly and to a number of visual status indicators distributed along at least a distal end of the elongated flexible circuit assembly. At least a portion of the number of visual status indicators are actuated, responsive to the control signal, to provide a visual indication of a status of equipment supported by the planar circuit board.

One or more aspects of the subject disclosure include an electronic system, having a housing that includes an equipment panel observable by a human operator during operation. The electronic system further includes a primary circuit board including a number of circuit devices attached thereon, wherein the primary circuit board is disposed within the housing, having an elongated edge extending along an interior surface of the equipment panel. The electronic system further includes an elongated circuit assembly having an array of light emitting diodes extending along at least a distal portion of the elongated circuit assembly, wherein the elongated circuit assembly is attached to the primary circuit board, along the elongated edge, such that the elongated circuit assembly is located, positioned, secured, encapsulated and/or otherwise confined between the elongated edge and the interior surface of the equipment panel. The electronic system further includes a controller circuit configured to provide a status indicator control signal, wherein the controller circuit is in communication with the array of light emitting diodes via electrical traces of the elongated circuit assembly, the light emitting diodes actuated according to the status indicator control signal to provide a visual indication of a status of the number of circuit devices that is observable at the equipment panel.

Electronic devices, such as computing and/or networking devices may be configured with electronic circuitry. For example, a rectangular enclosure may include one or more printed circuit boards (PCBs) housing electronic circuits supporting functionality of the device. Such enclosures typically provide a relatively small front panel area where status indicators, e.g., LED display panels, may be located to facilitate convenient inspection of the status of various parameters indicated on the device. Quite often, enclosed functional circuits of these devices generate a substantial amount of heat driven by trends that incorporate greater processing power and operational speeds into the same small enclosures. In such instances, equipment enclosures typically incorporate one or more cooling features that facilitate management of thermal loads. Examples include ventilation panels that may be used alone or in combination with forced air cooling, e.g., a fan.

In many instances, one or more panels of an equipment enclosure incorporate openings, screens and/or vents to facilitate heat transfer. As panel space may be limited, that space dedicated to cooling features may be maximized. In at least some embodiments, virtually all available panel may be allocated to cooling features. It is understood that some panel space may be allocated to and/or otherwise reserved for non-cooling features, such as cable interconnections, e.g., network ports, operator controls and the like. Any remaining panel space would represent that are to be optimized and/or maximized for cooling. It may be further appreciated that, as networked computing systems increase in complexity, individual network devices may be required to display status information pertaining to increasing numbers of parameters, e.g., corresponding to increased numbers of ports or system information. The various examples provided herein provide features that present substantial numbers of status indicators along one or more panels of an equipment enclosure, while preserving panel space for other applications, such as interconnects, operator controls and/or cooling.

Figure 1A:
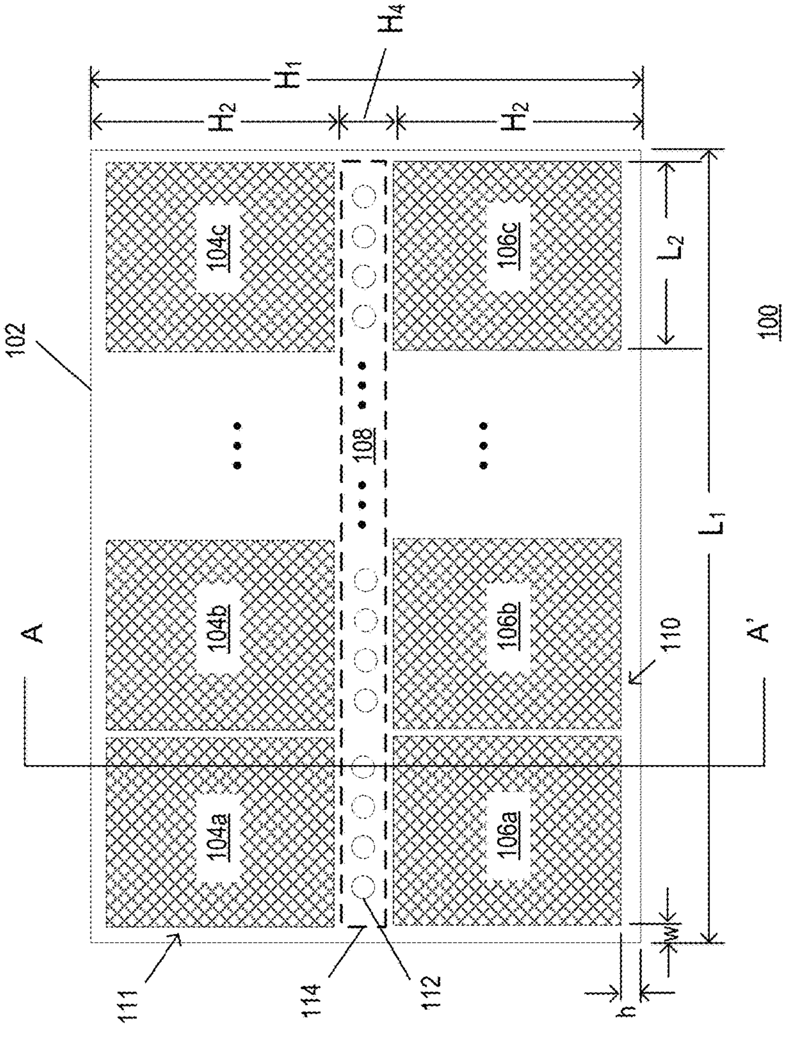
FIG. 1A is an elevation view illustrating a front panel of an example electronic device equipped with space-saving visual indicators in accordance with various aspects described herein.

FIG. 1A is an elevation view illustrating an example of a front panel 102 of a compact equipment enclosure of an example of an electronic device 100 equipped with space-saving visual indicators in accordance with various aspects described herein. Without limitation, the electronic device 100 can include any combination of electronic circuitry and/or electromechanical devices, generally configured to implement one or more functionalities. The front panel 102 may be viewable by a human observer and, as such, present a suitable location for presenting observable information as may vary from time to time either directly or remotely, e.g., via a video monitor. By way of example, the front panel 102 may present visual and/or audible indications that provide configuration and/or status information of the electronic device 100 and/or one or more sub-assemblies and/or components of the electronic device 100. For example, the electronic device 100 may be configured for a telecommunication application, such as a router, a switch, a gateway and the like. It is not uncommon for such devices to support multiple redundant functionalities, such as multiple router ports and/or switch ports and/or network interfaces. It is envisioned that in at least some embodiments, the status information may identify configuration and/or status of the individual ports and/or interfaces, e.g., signifying whether a port is active, idle, transmitting, receiving and/or experiencing an error state.

According to the illustrative example, the front panel 102 is rectangular, although other shapes and/or sizes are contemplated. The front panel 102 extends over a surface area $A_{Total}$, defined by the panel length $L_1$ and height $H_1$, i.e., with the total area determined according to the product of the length and height, i.e., $A_{Total}=L_1 \times H_1$. The front panel 102 also includes an example status indicator arrangement 108. The status indicator arrangement 108 may include one or more visual status indicators 112. The individual status indicators may include visual status indicators, audible status indicators or any combination of visual and audible status indicators. By way of example and without limitation, visual status indicators 112 may include one or more of an incandescent bulb, fluorescent lamps, neon lamps, light emitting diodes (LEDs), display panels, e.g., configured to display an image and/or video, touch panels, an alphanumeric indicator, and/or any combination thereof. By way of further example, audio indicators may include one or more of a buzzer, a speaker, a piezoelectric transducer, a bell, and the like.

In at least some embodiments, the front panel 102 may include one or more reserved areas. Any reserved area generally indicates that the area is unavailable to accommodate status indicators. In at least some embodiments, an area may be reserved according to a particular function, e.g., accommodating a physical network interface connector or port and/or ventilation features. For example, according to the illustrative embodiment, an upper portion of the front panel 102 includes a first group of reserved areas 104*a*, 104*b*, 104*c*, generally 104, while a lower portion of the front panel 102 includes a second group of reserved areas 106*a*, 106*b*, 106*c*, generally 106. Accordingly, these reserved areas 104, 106 would be unavailable to accommodate any of the status visual indicators 112 of the status indicator arrangement 108.

By way of example, one or more of the reserved areas 104, 106 may be unavailable because it is occupied by another device, such as an electrical connector and/or an electromechanical port that would preclude positioning of a visual status indicator 112 there. Alternatively, or in addition, one or more of the reserved areas 104, 106 may be unavailable because it is occupied by a vent, e.g., a ventilation panel as may be used for intake and/or exhaust air flow. In at least some embodiments, one or more of the reserved areas 104, 106 may be unavailable because it is occupied by a design element, such as a label and/or branding mark. According to the foregoing examples, unavailability is due to the existence of a structure that may be observable from an observer of the front panel 102.

It is conceivable that in at least some embodiments, unavailability may be due to a condition occurring on an interior portion of the electronic device 100, e.g., behind the front panel 102. Such conditions may include, without limitation, a location of an electrical, mechanical and/or electromechanical assembly, device and/or component within an interior region of the electronic device 100 and proximate to an interior surface of the front panel 102. The condition may arise from a mechanical interference, e.g., insufficient room to accommodate the visual status indicator 112, and/or some other reason, such as a possibility of thermal interference and/or electrical interference, e.g., electromagnetic interference. It is understood that in such instances, the internal condition may not be visible by an observer of the front panel 102 but may nevertheless preclude positioning of a visual status indicator 112 there.

Each reserved area 104, 106 representants a respective surface area $A_i$, defined by a reserved area length $L_2$ and height $H_2$, i.e., the respective surface area $A_i = L_{1i} \times H_{1i}$. A total reserved area $A_{Reserved}$ may be determined as a sum of the individual reserved areas $A_i$, i.e., $A_{Reserved}=2; A_i$. In at least some embodiments, a ratio of reserved area to available area may be determined as a value $A_{Reserved}/A_{Total}$. Likewise, an unreserved area may be determined as a difference between the total area and the reserved area, i.e., $A\ U_{nreserved} = A_{Total} - A_{Reserved}$. It is understood in such arrangements that the visual status indicators 112 would necessarily be positioned within the unreserved area of the front panel.

In at least some embodiments, a ratio of the reserved to unreserved areas may be maximized. For example, a maximum reserved area may be determined to accommodate a largest number of interconnections and/or communication ports as possible for a given surface area of the front panel 102. Alternatively, or in addition, the maximum reserved area may be determined to accommodate the largest number of cooling vents possible. Such a maximizations of reserved area may be determined according to the total surface area of the front panel 102, less any portions thereof that may be excluded and/or otherwise unavailable to accommodate the communication ports and/or cooling vents.

In at least some embodiments, the front panel 102 may include one or more exclusion regions that may be unavailable for reservation according to the example reserved areas 104, 106. By way of example, such exclusion regions may include at least a portion of a peripheral region of the front panel 102 as may be occupied by structural supports, e.g., for attachment to top, bottom and/or side panels, and/or internal structures such as mounting frames and/or printed circuit boards. According to the illustrative example, the front panel 102 includes a bottom exclusion region 110 of a height h extending between a bottom perimeter of the front panel 102 and a bottom edge of the lower reserved areas 106. Likewise, the example front panel 102 may include an upper exclusion region of the same or different height h extending between a top perimeter of the front panel 102 and an upper edge of the upper reserved areas 104. Similarly, the example front panel 102 may include lateral exclusion regions, e.g., a left and/or right exclusion region having the same or different widths w extending between respective side perimeters of the front panel 102 and an adjacent side edges of the upper and lower reserved areas 104, 106.

According to the illustrative example, a central exclusion region 114 is provided along an elongated central region of the front panel 102. The central exclusion region 114 occupies a height $H_4$ and extends for a length $L_1$, representing a central exclusion region area $A_{Exclusion} = H_4 \times L_1$. The central exclusion region 114 may be unavailable for reservation due to the location of an adjacent edge of a printed circuit board (PCB), e.g., a main PCB or motherboard. In is understood that in at least some embodiments, one or more of any identified exclusion regions, e.g., the central exclusion region 114, may be available to accommodate one or more of the visual status indicators 112, despite being unavailable to accommodate a reserved area. Indeed, at least one strategy that supports maximizing reserved area(s) 104,106, while also providing visual status indicators 112, takes advantage of locating at least a portion of the status indicators within the exclusion regions.

Figure 1B:
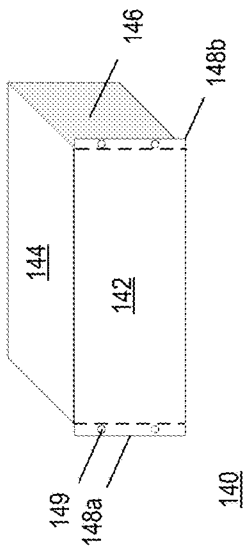
FIG. 1B is a front perspective view of the example electronic device illustrated in FIG. 1A in accordance with various aspects described herein.

By way of example, the electronic circuitry and/or electromechanical devices of the example electronic device 100 may be housed at least partially within a supporting structure. Examples supporting structures may include, without limitation, a chassis, an open frame, a partially enclosed frame, and/or an enclosure, e.g., a box. Referring next to FIG. 1B, a front perspective view of an example of an equipment enclosure 140 of an example device in accordance with various aspects described herein. The equipment enclosure 140 has six panels, including a front panel 142, a top panel 144 and a right-side panel 146 as shown. The front panel corresponds to the example front panel 102 of the electronic device 100 (FIG. 1A) Other panels include a left panel, a rear panel and a bottom panel, none of which are visible in the example illustration.

In at least some embodiments, the equipment enclosure 140 may be configured for mounting within another support structure, such as a frame and/or a cabinet. Examples include, without limitation, standard 19-inch equipment racks adapted to secure one or more electronic devices in a stacked arrangement, e.g., a vertically stacked arrangement. It is common for equipment to accommodate such a standard form factor by incorporating a frame and/or enclosure configured to fit within and/or attach to such standard equipment racks. According to the illustrative example, the front panel 142 includes one or more mounting brackets, such as the example mounting flanges 148*a*, 148*b*, generally 148. The flanges, in turn, may include one or more attachment and/or fastening enhancement features, mechanisms and/or devices, such as captive hardware, e.g., screws, slots and/or holes sized and positioned to accept mounting hardware, e.g., screws. When the equipment enclosure 140 is mounted within an equipment rack, one or more panels may be accessible, while other panels may be inaccessible. For example, a front and/or rear panel may be accessible for cable interconnects and/or human observation.

Although reference is made to a front panel, e.g., a front panel of a compact equipment enclosure, it is envisioned that the configurations and various techniques disclosed herein may be applied to other panels of an enclosure, such as a rear panel, a top panel, and so on. It is further understood that the various configurations and techniques disclosed herein may be applied to one panel, or to a combination of more than one panel, e.g., a front and rear panel.

Referring next to FIG. 1C, a section view is provided illustrating a front portion 150 of the example of the electronic device 100 (FIG. 1A) accordance with various aspects described herein. In particular, the section view is taken along line A-A' of FIG. 1A. According to the illustrative example, a top, bottom and side panels of an equipment enclosure 140 are attached to a peripheral region of the front panel 102 as illustrated in part by the side panel 154 and the upper and lower panels 156*a*, 156*b* of the equipment enclosure 140 (FIG. 1B). An interior region of the equipment enclosure 140 includes a main PCB 162, shown in partial cross section. The main PCB 162 is planar and arranged along a mid-portion of the equipment enclosure 140, e.g., extending from approximately an interior surface 153 of the front panel 102 towards a rear panel, not shown.

The illustrative embodiment also includes at least one upper chassis module 158 extending from a top surface of the main PCB 162 to approximately an interior surface of the upper panel 156*a*. Likewise, the illustrative embodiment includes a lower chassis module 160 extending from a bottom surface of the main PCB 162 to approximately an interior surface of the bottom panel 156*a*. In at least some embodiments, the upper and/or lower chassis modules 158, 160 are attached to respective abutting surfaces of the main PCB 162, e.g., being mounted thereon according to a mechanical and/or electrical fastening mechanism. The fastening mechanism may include one or more of a mechanical fastener, such as a rivet, a screw, an interference fit, a pin-socket arrangement, a solder joint, a weld, a chemical fastener, e.g., an adhesive, such as a glue and/or an epoxy, and the like.

According to the illustrative embodiment, the upper and lower chassis modules 158, 160 extend to and/or at least partially through an adjacent region of the front panel 102. The example chassis modules 158, 160 may include, without limitation an electrical connector, a communication port, a heatsink and/or a vent. Accordingly, an upper reserved area 104*a* accommodates a corresponding portion of the upper chassis module 158, while a lower reserved area 104*b* accommodates a corresponding portion of the lower chassis module 160.

The main PCB 162 defines a leading edge 163 arranged adjacent to a central region of the interior surface 153 of the front panel 102. The leading edge 163 may be substantially close, e.g., in near intimate contact the interior surface 153 of the front panel 102, but allowing for a relatively small gap g. It is understood that the gap g may be somewhat exaggerated in size for illustrative purposes. Nevertheless, the gap g may be sufficient to accommodate at least a portion of a status indicator assembly 164, also shown in cross section. In at least some embodiments, the status indicator assembly 164 includes a status indicator abutting and/or extending at least partially into the interior surface 153 of the front panel 102. The status indicator assembly 164 may be in communication with a status indication controller 166, which may be located within the equipment enclosure 140, e.g., on the main PCB 162. The status indication controller 166 may provide one or more control signals adapted to selectively actuate one or more of the visual status indicators 112 (FIG. 1A). Alternatively, or in addition, the front panel 102 may include a transmission device 168, such as an acoustic and/or optical waveguide, configured to direct a status indication expressed by a status indicator 170 of the status indicator assembly 164 towards an exterior surface of the front panel 102, such that expression of the status indication may be perceptible by a human observer.

Figure 2B:
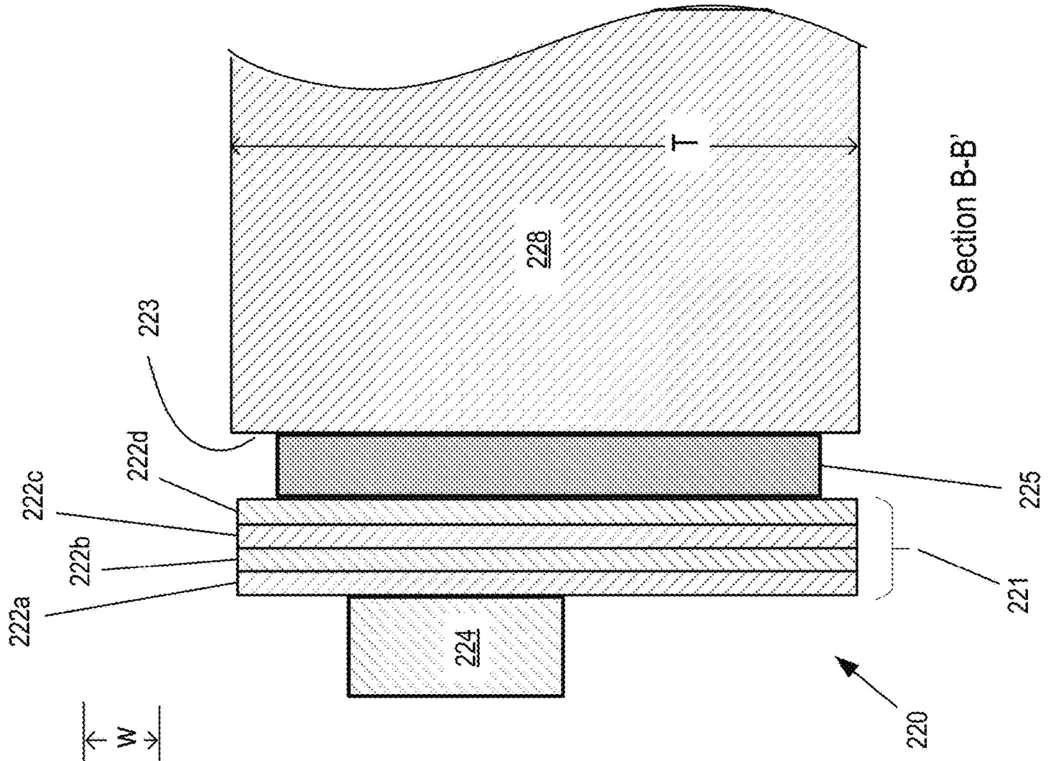
FIG. 2B is a section view of the example flexible status indicator assembly illustrated in FIG. 2A in accordance with various aspects described herein.
Figure 2A:
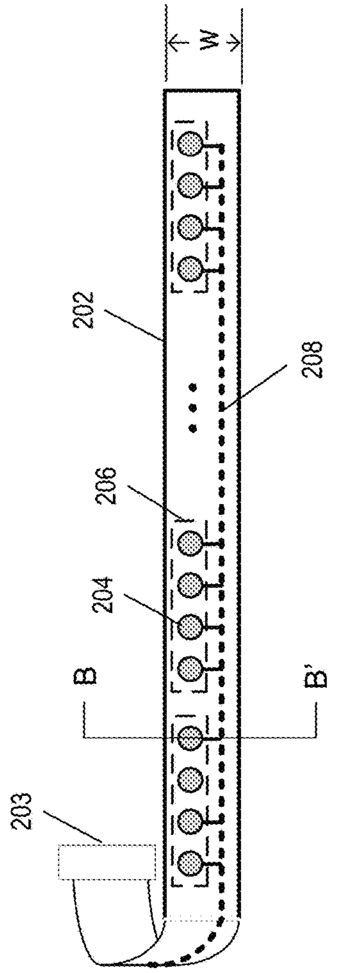
FIG. 2A is a perspective view illustrating a panel-facing surface of an example flexible status indicator assembly in accordance with various aspects described herein.

FIG. 2A is a perspective view illustrating a panel-facing surface of an example of a flexible status indicator assembly 200 in accordance with various aspects described herein. The flexible status indicator assembly 200 includes a substrate 202 having an elongated, substantially narrow and thin configuration. The substrate 202 may extend for a length that is many times its width, e.g., having a length that is up to 10, 20, 30, 50 or even 100 or more times its width. Similarly, the substrate may have a thickness that is substantially less than its width, e.g., having a thickness that is up to 10, 20, 30, 50 or even up to 100 or more times thinner than its width. In at least some embodiments, the substrate 202 is flexible. For example, the substrate 202 may be pliable, conformable, bendable and/or foldable. In at least some embodiments the substrate 202 is bendable to a minimum dimension, e.g., a minimum bend radius $r_{min}$. In at least some embodiments, the minimum dimension may be determined according to a material and/or construction of the substrate 202 and/or according to a configuration of the substrate, e.g., having one or more different layers and/or according to circuitry supported by the substrate, e.g., conductive etches that may reside on one or more layers. Bends to radii greater than $r_{min}$ may be accomplished without concern, whereas bends less than $r_{min}$ may result in operational impacts and/or device damage, e.g., breakage. Alternatively, or in addition, the substrate 202 may be rigid, or substantially rigid, e.g., having a contour adapted to extend around an edge portion of a main PCB 162 (FIG. 1C). In at least some embodiments, the substrate 202 may be configured with different segments having different mechanical properties along its length, such as a first segment that is substantially rigid and a second segment that is flexible, pliable, bendable, foldable and/or otherwise conformable.

In more detail, the example flexible status indicator assembly 200 includes an array of status indicator elements 204. The status indicator elements 204 may include, without limitation, any combination of the various examples provided herein. The flexible status indicator assembly 200 further includes a terminal end, e.g., having one or more electrical contacts. In at least some embodiments, the contacts are provided in the form of a connector 203. The flexible status indicator assembly 200 further includes an electrical circuit 208. In at least some embodiments, the electrical circuit 208 includes one or more electrical circuits, electrical leads and/or conductive traces extending between at least one of the status indicator elements and the connector 203.

In some embodiments, the electrical circuit 208 includes at least one conductive trace for each status indicator element 204. However, as the number of status indicator elements 204 mounted on a single substrate 202 may be significant, e.g., 10, 20, 30, 50 or 100 or more, the electrical circuit 208 may be arranged to provide independent control of each status indicator element 204 in an efficient manner by using fewer conductive traces than number of status indicator elements 204. A ratio of status indicator elements 204 to conductive traces of such efficient designs may be substantial, e.g., 2:1, 4:1, 10:1 or more.

In at least some embodiments, the status indicator elements 204 of a common substrate 202 may be arranged according to multiple status indicator arrays and/or groups 206. In at least some embodiments, the status indicator groups may be arranged along the length of the flexible status indicator assembly 200 according to a spatial multiplexing scheme. For example, a location of a status indicator group 206 may correspond with a proximal device, e.g., an adjacent electrical connector and/or telecommunications port.

FIG. 2B is a section view of the example of a flexible status indicator assembly 220 illustrated in FIG. 2A in accordance with various aspects described herein. The sectional view is taken along line B-B' (FIG. 2A) and includes a cross section of a portion of the flexible status indicator assembly 220. The flexible status indicator assembly 220 includes a flexible substrate 221 that may include one or more distinguishable layers. According to the illustrative example, the flexible substrate 221 includes four layers 222*a*, 222*b*, 222*c*, 222*d*, generally 222. In at least some embodiments, at least some of the layers include conductive traces of the electrical circuit 208 (FIG. 2A). An example status indicator element 224 is also shown in cross section, mounted to an outer surface of the flexible substrate 221. It is understood that the status indicator element may include one or more electrical interconnections to conductive traces of one or more of the layers 222.

The example flexible status indicator assembly 220 is positioned in alignment with a front facing edge of a main PCB 228. In at least some embodiments, a substrate width w (FIG. 2A) of the substrate 202 may be equal to, slightly larger and/or slightly narrower than a thickness T of the main PCB 228. For example, the width w may be less than about 5T, or less than about 3T, or less than about 2T, or approximately T. To the extent a portion of the front panel is excluded from designation as a reserved space, e.g., along a front edge of the main PCB 228, at least a portion of that excluded region may be utilized by the flexible status indicator assembly 220.

In at least some embodiments, the flexible status indicator assembly 220 includes a fastening mechanism 225 adapted to secure at least a portion of the flexible status indicator assembly 200 with respect to one or more of the equipment enclosures 140 (FIG. 1C), the front panel 102 and/or a forward edge 223 of the main PCB 228. The fastening mechanism 225 may include, without limitation, one or more of a mechanical fastener, a magnetic fastener, a chemical fastener and/or a weld. Examples of mechanical fastener include, without limitation, a pin, a rivet, a screw, a staple, a tack, an interference connector, and the like. Examples of chemical fasteners include, without limitation, an adhesive, a glue, an epoxy, and the like. In at least some embodiments, operation of the fastening mechanism 225 is reversable. Namely, the flexible status indicator assembly 220 may be attached, separated and reattached, e.g., to facilitate service and/or repair and replace activities.

Figure 2C:
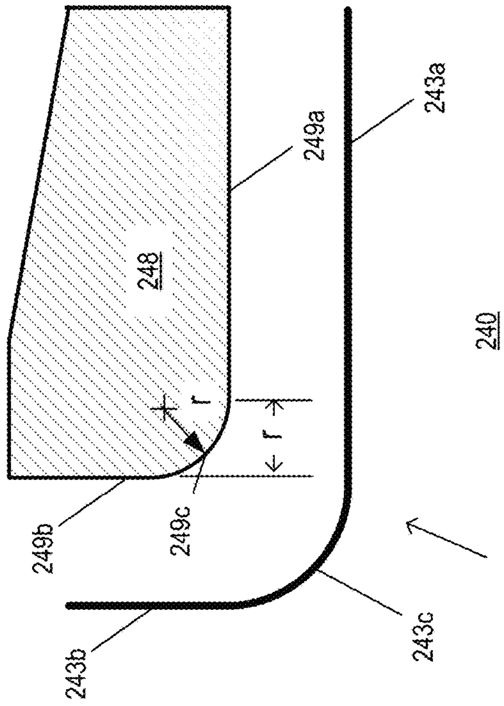
FIG. 2C is an exploded plan view illustrating a top edge of the example flexible status indicator assembly illustrated in FIGS. 2A-2B, in proximity to a portion of a main printed circuit board in accordance with various aspects described herein.

FIG. 2C is an exploded plan view of a front corner portion of an electronic device 240 in accordance with various aspects described herein. The illustrated portion of the electronic device 240 includes a flexible status indicator assembly 242 and a portion of a main PCB 248. In particular, the exploded view includes a top edge of the flexible status indicator assembly 242 in proximity to the portion of a main PCB 248. According to the illustrative embodiment, the flexible status indicator assembly 242 includes an elongated structure having a panel segment 243*a* at one end and a side segment 243*b* at another end, with both segments 243*a*, 243*b* joined by a contoured segment 243*c*. In this embodiment, the contoured segment includes a radius that confirms to a radial edge 249*c* of the main PCB 248. Although a radial edge 249*c* is illustrated, it is understood that other shapes may be utilized, such as arcs, e.g., parabolic arcs, or more generally, any curvilinear shape, and/or linear shape, and/or combination of curvilinear and linear shapes.

In at least some embodiments, a shape of the corner of the main PCB 249 may be determined according to a shape of the flexible status indicator assembly 242, e.g., according to a minimum bend radius $r_{min}$ of the flexible status indicator assembly 242. Accordingly, the radial edge 249*c* may have a radius equal to and/or slightly larger than the minimum bend radius. The illustrated portion of the main PCB 248 also includes a panel facing edge 249*a* and a side facing edge 249*b* joined by the radial edge 249*c*. It is understood that a size, shape and/or contour of the corner of the main PCB 248 may impose restrictions upon placement of electrical, mechanical and/or electromechanical components thereon. For example, a radius of the radial edge 249*c* may impose a restriction as to how much surface area of the front panel 102 (FIG. 1A) may be available for reservation. It is appreciated that any such restrictions are undesirable, such that shapes, radii and/or contours may be selected to optimize utilization of panel space.

Figure 3:
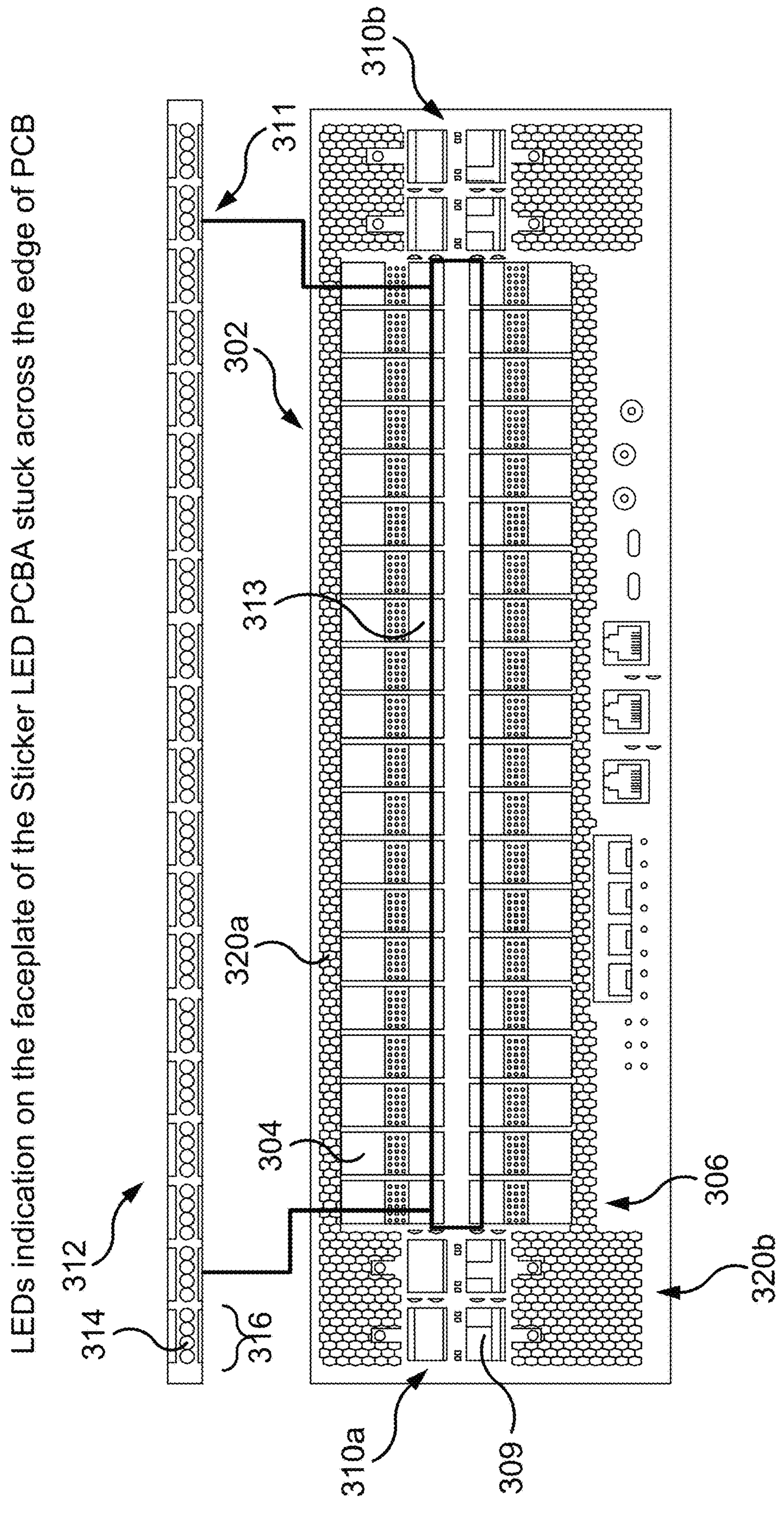
FIG. 3 is a more detailed elevation view illustrating the front panel of another example electronic device in accordance with various aspects described herein.

FIG. 3 is a more detailed elevation view illustrating an example of a front panel 300 of another example electronic device in accordance with various aspects described herein. At least some electronic devices, such as telecom products, include multiple communication ports along with an arrangement of visual indicators, e.g., LEDs, associated with the ports. For example, at least one LED indicator may be associated with each port. The front panel 300 includes a first group of ports 302 that includes a quantity of eighty small-form-factor, 112 giga-bit-per-second (SFP112) ports 304, each capable of dissipating about 4 Watts. The front panel 300 includes a first group of ports 302 that includes a quantity of eight quad-small-form-factor, double-density (QSFPDD) ports 309, each capable of dissipating about 28 Watts.

The first group of ports 302 are arranged in four horizontal rows, with each row containing twenty ports. According to the example configuration, the first group of ports 302 can be considered as twenty, vertical, four-port stacks 306 distributed along a horizontal axis of the front panel 300. Other areas of the front panel 300 in and around the first group of ports, includes openings or vents 320*a* that may be used to allow cooling air to enter and/or exit the electronic device through the front panel 300. The QSFPDD ports 309 are arranged in two groups of four. A lefthand group of ports 310*a* is located between a left end of the first group of ports 302 and a left side of the front panel 300. Similarly, a righthand group of ports 310*b* is located between a right end of the first group of ports 302 and a right side of the front panel 300. Other areas of the front panel 300 in and around the first group of ports 302, include a first area openings or vents 320*a* that may be used to allow cooling air to enter and/or exit the electronic device through the front panel 300. Similarly, still other areas of the front panel 300 in and around the second groups of ports 310*a*. 310*b*, may include second areas with openings or vents 320*b* that, once again, may be used to allow cooling air to enter and/or exit the electronic device through the front panel 300.

Many times, a form factor of a product imposes constraints on a number of network ports that may be accommodated. In this instance, optical ports may be accommodated via the front panel 300. A high number of ports, such as the example having eighty-eight ports, would necessarily occupy a substantial area of the front panel 300. As these optical ports may include internal electronic devices, such as high-speed transceivers, they may consume a significant amount of power, consequently dissipating a substantial amount of heat in a relatively small, confined region. It may be appreciated that it may be important to control operational temperatures in such applications. It is understood that in at least some embodiments, the number and/or size of openings, e.g., vents, on the front panel 300 may be maximized to provide a greatest area possible area for heat dissipation and/or cooling air transfer. FIG. 3 also includes a drawing inset 311 that provides an enlarged view of a central region 313 of a portion of the front panel 300. The central region 313 includes an arrangement of visual indicators in the form of a linear group of status indicators 312 including eighty LEDs 316. Each LED 316 provides status and configuration information of a respective port of the example telecom device. The LEDs 316 may be arranged in groups 314. Each group 314 includes four LEDs 316 associated with four adjacent SFP112 ports 304, e.g., first and second LEDs 316 of the group 314 being associated with a top pair of the SFP112 ports 304 while third and fourth LEDs 316 of the group 314 are associated with a bottom pair of the SFP112 ports 304. A size of the group 314 may be determined according to a dimension of an associated port, e.g., a width of the SFP112 port 304. Such group confinement restrictions may be used to spatially multiplex the LEDs 316, to facilitate an association between the LEDs 316 and associated SFP112 ports 304 to a human observer.

In consideration of the respective areas of the front panel 300 being maximized for numbers of ports 304, 309 and vents 320*a*, 320*b*, any remaining locations on the front panel 300 for accommodation of the status indicators 312 is limited. In such scenarios, it is not feasible to have traditional way of accommodating LEDs on faceplate. The central region 313 extends along a front edge of an interior main PCB (not shown). Accordingly, the central region 313 would be unavailable to accommodate any ports 304, 309 and offering no apparent benefit for additional cooling vents, as the interior of the central region 313 is substantially blocked by an edge of the main PCB. Such a space may referred to as an exclusionary space, at least in that it is excluded from consideration of accommodating ports and/or cooling. Beneficially, however, the techniques disclosed herein provide a specially configured and/or operated status indicator assembly adapted for installation and/or operation on such exclusionary spaces.

Figures 4A, 4B:
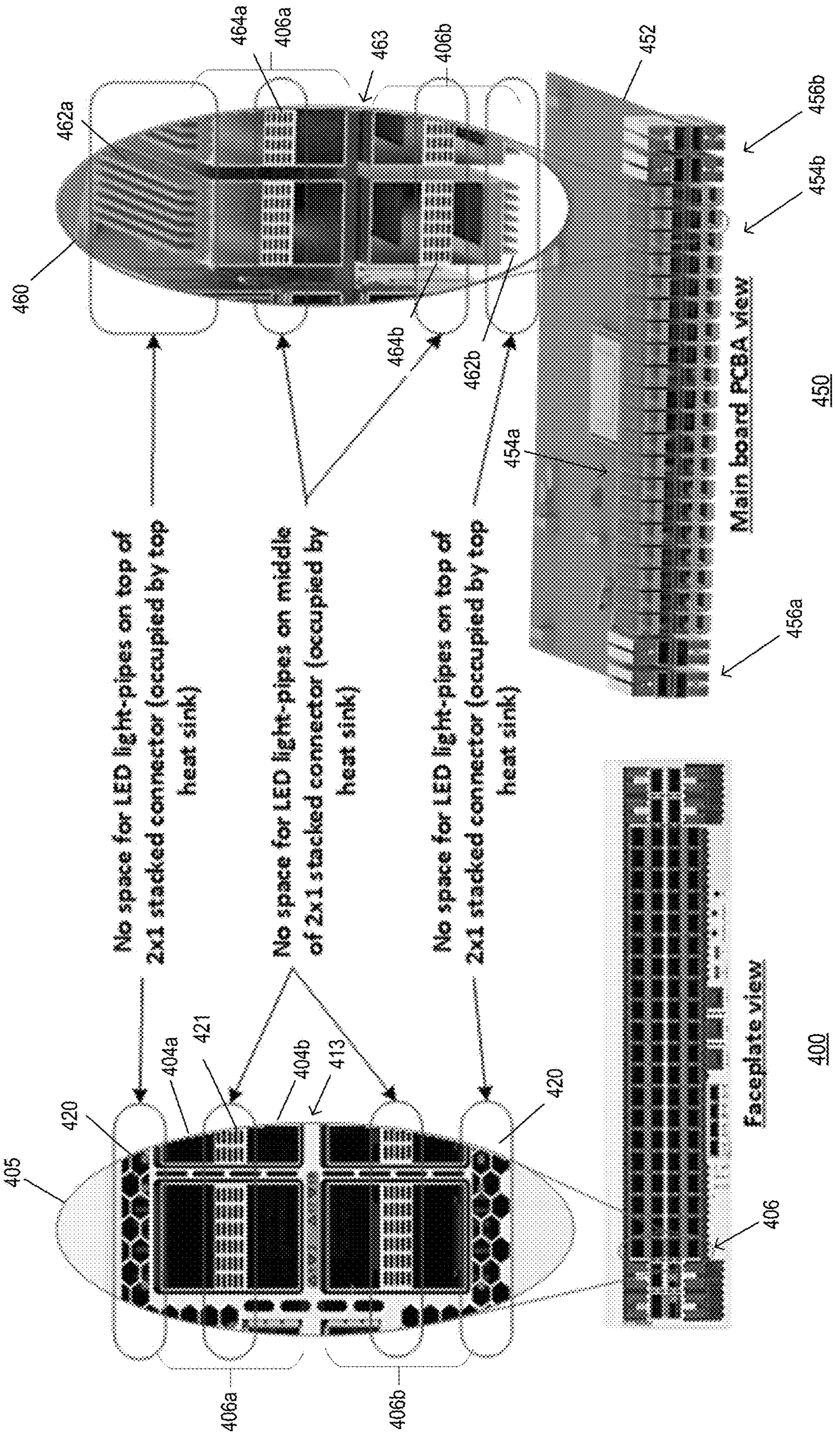
FIG. 4A is an elevation view illustrating a front panel the example electronic device illustrated in FIG. 3, equipped with space-saving visual indicators in accordance with various aspects described herein.
FIG. 4B is a perspective view illustrating an interior portion of the example electronic device illustrated in FIG. 4A with the front panel removed in accordance with various aspects described herein.

FIG. 4A is an elevation view illustrating a more detailed view of an example of a faceplate or front panel 400 of the example electronic device illustrated in FIG. 3, equipped with space-saving visual indicators in accordance with various aspects described herein. The front panel 400 includes twenty quad port stacks 406, each quad port stack including four SFP112 ports 404*a*, 404*b*, generally 404 arranged in vertical alignment. FIG. 4A also includes a drawing inset 405 that illustrates an example quad port stack 406 in more detail. The quad port stack 406 includes an upper quad port pair 406*a* and a lower port pair 406*b*, with all four ports 404 arranged in vertical alignment. Also show are ventilation features of the front panel 400. Namely, a first vent 420 provides cooling air access in regions of the front panel 400 that include an are above the upper quad port pair 406*a* and below the lower quad port pair 406*b*. In at least some embodiments, a second vent 421 provides cooling air access in regions of the front panel 400 located between stacked ports 404 of the upper quad port pair 406*a* and/or between stacked ports 404 of the lower quad port pair 406*b*.

It may be appreciated that areas of the front panel 400 including ventilation features, e.g., louvers, vents, screens and/or air filters, may not include status indicators, as such indicators would occupy areas of the front panel 400 dedicated to cooling. In such high-density and/or high-power applications, cooling areas are preferably maximized. It is observed that the illustrative front panel 400 includes a central region 413 located between the upper and lower quad port pairs 406*a*, 406*b*, generally 406. The central region 413 may be narrow and is not allocated to either of the vents 420, 421. As such, the central region 413 presents an opportunity for hosting status indicators. According to the example embodiment, the central region 413 is configured to accommodate an arrangement of status indicators associated with the quad port pairs 406.

FIG. 4B provides a perspective view illustrating an interior portion of a telecom device 450 utilizing the front panel 400 illustrated in FIG. 4A with the front panel 400 removed in accordance with various aspects described herein. The telecom device 450 includes a central PCB 452. The central PCB 452 is horizontally located in a middle region of the telecom device 450 and supports a first array of twenty upper transceiver pairs 454*a*, stacked in pairs and mounted to an upper surface along a front edge of the central PCB 452. The transceiver pairs 454*a*, 454*b*, generally 454 are associated with the SFP112 ports 304 (FIG. 3). The central PCB 452 also supports a second array of twenty lower transceiver pairs 454*b*, stacked in pairs and mounted to a lower surface along the front edge of the central PCB 452. The upper and lower transceiver pairs 454*a*, 454*b* are vertically aligned to form twenty quad transceiver stacks, with the upper and lower mounting arrangement sometimes referred to as a "belly-to-belly" configuration. High-power transceivers associated with the QSFPDD ports 309 (FIG. 3) are similarly stacked in vertical, belly-to-belly configurations, with a first high-power transceiver group 456*a* located along a left end of the front edge of the central PCB 452 and a second high-power transceiver group 456*b* located along a right end of the front edge of the central PCB 452.

FIG. 4B also includes a drawing inset 460 that illustrates a first group of outer heatsinks 462*a* located along an upper surface of the upper transceiver pair 406*a* and a second group of outer heatsinks 462*b* located along a lower surface of the lower transceiver pair 406*b*. Similarly, a first group of inner heatsinks 464*a* located in between transceivers of the upper transceiver pair 406*a* and a second group of inner heatsinks 464*b* located in between transceivers of the lower transceiver pair 406*b*. It may be appreciated that there may be insufficient space to accommodate status indicators and/or light-pipes used in combination with internal LED indicators either above the upper transceiver pair 406*a*, below the lower transceiver pair 406*b*, because these areas are occupied by the outer heatsinks 462*a*, 462*b*. Likewise, there insufficient space to accommodate status indicators and/or light-pipes used in combination with internal LED indicators in between either of above the upper transceiver pair 406*a* or the lower transceiver pair 406*b*, because these areas are occupied by the inner heatsinks 464*a*, 464*b*. What space remains available in proximity to the quad port pairs 406 is the narrow space 463 located in between the upper transceiver pair 406*a* and the lower transceiver pair 406*b*. This space aligns substantially with the front edge of the central PCB 452. Accordingly, space availability within an interior region of the telecom device 450 is limited.

Figure 5:
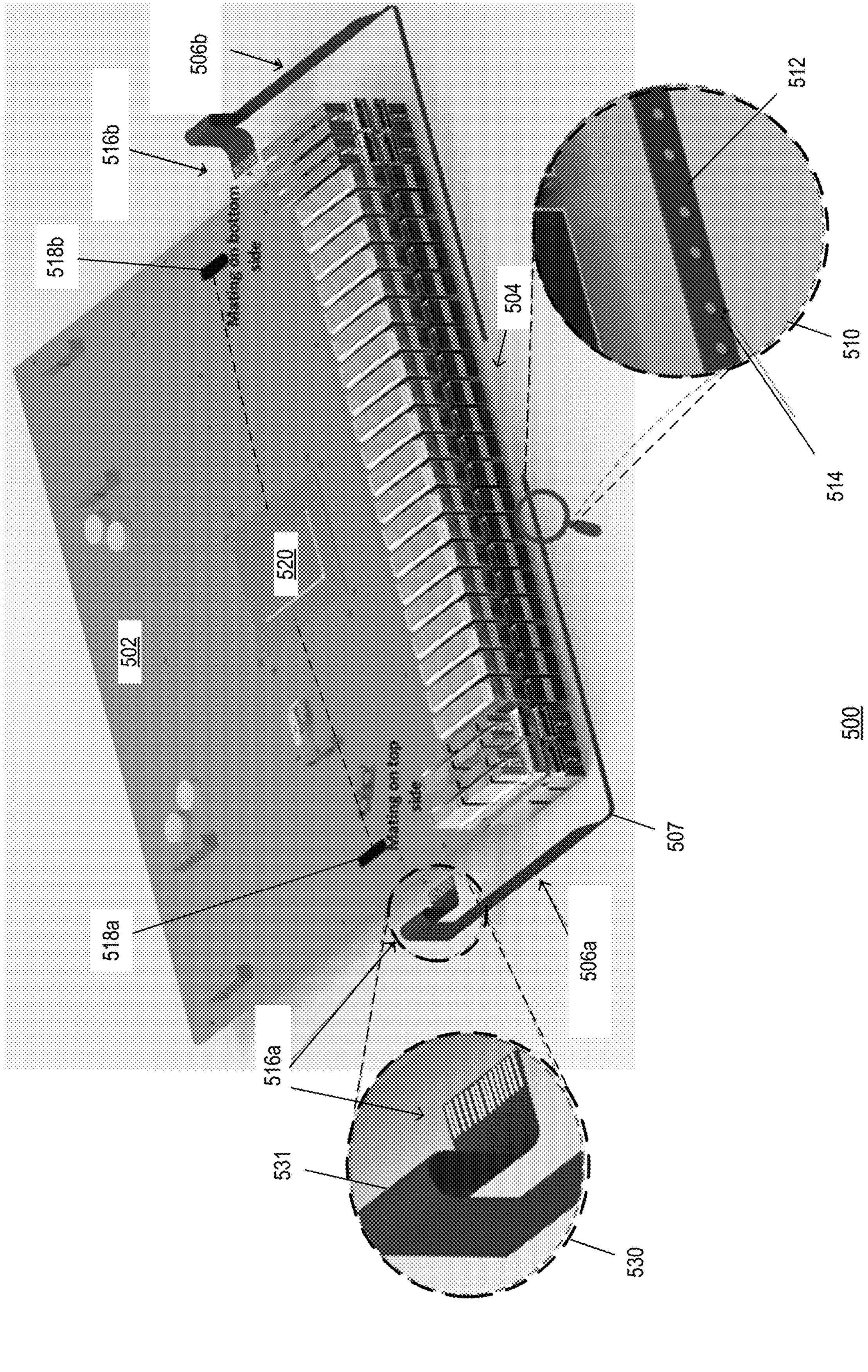
FIG. 5 is a more detailed, exploded perspective view illustrating an interior portion of the example electronic device illustrated in FIG. 3 and FIGS. 4A-4B in accordance with various aspects described herein.

FIG. 5 is a more detailed, exploded perspective view illustrating an interior portion of an example telecom device 500, according to the devices 100, 140, 150, 200, 20, 240, 300, 400, 450 illustrated in FIGS. 1A-1C, FIGS. 2A-2C, FIG. 3 and FIGS. 4A-4B in accordance with various aspects described herein. The telecom device 500 includes a main PCB 502 having an arrangement of network transceivers 504 attached to the main PCB 502 and aligned along a front edge of the main PCB 502. The telecom device 500 includes a first status indicator assembly 506*a* providing indications of status and/or configuration information of an associated first subset of the arrangement of transceivers 504. Likewise, the telecom device 500 includes a second status indicator assembly 506*b* providing indications of status and/or configuration information of an associated second subset of the arrangement of network transceivers 504. According to the example illustration, the first status indicator assembly 506*a* is associated with a lefthand portion of the arrangement of network transceivers 504, while the second status indicator assembly 506*b* is associated with a righthand portion of the arrangement of network transceivers 504. A first drawing inset 510 illustrates in more detail, a segment of the first status indicator assembly 506*a* including a flexible printed circuit 512 and a group of LED indicators 514. A second drawing inset 530 illustrates in more detail, a proximal portion 531 of the first sticker LED PCBA 506*a* a first terminal end 516*a* of the first status indicator assembly 506*a*. A second terminal end 516*b* of the second status indicator assembly 506*b* may be configured in a similar manner. Each of the first and second terminal ends 516*a*, 516*b* is positionable and interconnectable to a corresponding electrical connector 518*a*, 518*b*. The electrical connectors 518*a*, 518*b*, generally 518, in turn, are in communication with a status indication controller 520.

In at least some embodiments, the status indicator assembly 506*a*,506*b*, generally 506, includes an adhesive backed PCB 512, e.g., a sticker LED PCBA (Printed Circuit Board Assembly) 512. The sticker PCBA 512 may adhere to and/or be otherwise stuck across a front edge of the main PCB 502 thickness using a suitable adhesive. In some embodiments, a single sticker PCBA 512 may accommodate all eighty LEDs 514. Alternatively, or in addition, multiple sticker PCBAs 512 may be utilized, with each sticker PCBA accommodating a subset of the total number of LEDs 514. For example, a first sticker LED PCBA 506*a* may be configured with forty LEDs 514, while a second sticker LED PCBA 506*b* may be configured with another forty LEDs 514 to collectively cover all eighty SFP112 port LEDs 514. According to the illustrative example, the first sticker PCBA 506*a* is associated with forty ports of a left half of the arrangement of transceivers 504, while the second sticker PCBA 506*b* is associated with forty ports of a right half of the arrangement of transceivers 504. In at least some embodiments, the first and second sticker PCBAs 506*a*,506*b* have a common configuration. Accordingly, duplicates of the same PCBA 506 may be used for each of the left half and the right half of the arrangement of transceivers 504, e.g., by assembling the status indication system according to a mirrored configuration. Since this sticker PCBA 506*a* is mounted across a thickness of the PCB 502, it does not obstruct air flow. Each of the example sticker PCBAs 506 terminate to a controller module, e.g., to the status indication controller 520, e.g., located on the main PCB 502 via respective connectors 516*a*, 516*b*, generally 516. For flexible PCB applications, it is envisioned that the connectors may include flex-type connectors to simplify design, construction and/or costs.

Figure 6B:
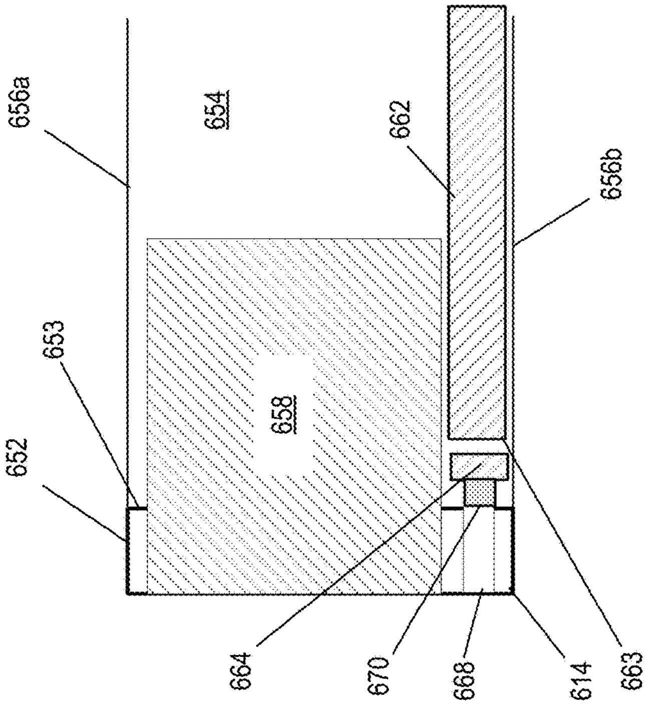
FIG. 6B is a section view illustrating a front portion of the example electronic device illustrated in FIG. 6A in accordance with various aspects described herein.
Figure 6A:
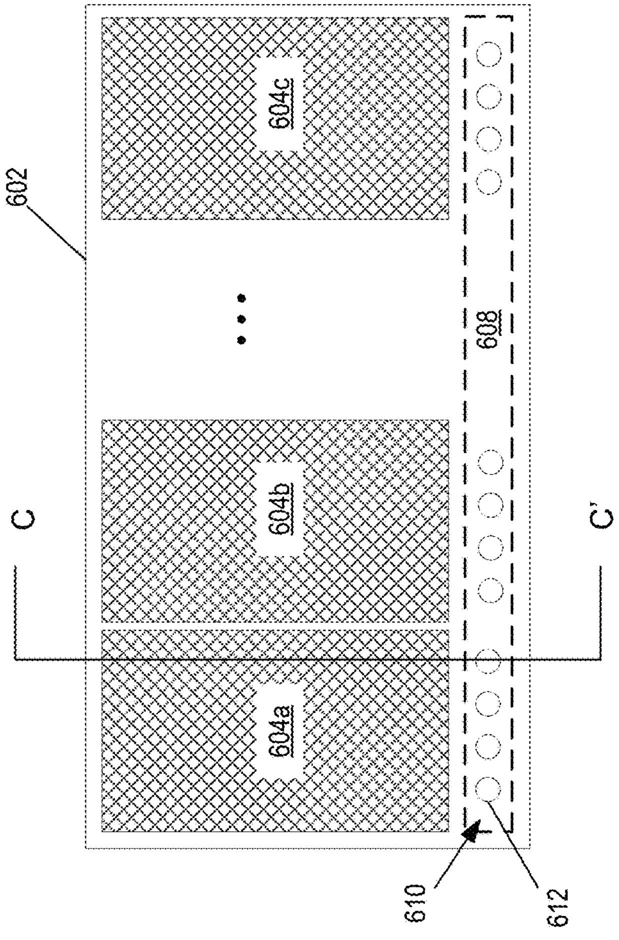
FIG. 6A is an elevation view illustrating a front panel of another example electronic device equipped with space-saving visual indicators in accordance with various aspects described herein.

FIG. 6A provides an elevation view illustrating a front panel 602 of another example electronic device 600 equipped with space-saving visual indicators in accordance with various aspects described herein. The electronic device 600 includes an equipment enclosure or housing 654 (FIG. 6B) that includes an exposed panel 602 that may be positioned for observance by a human observer. The exposed panel 602 includes an arrangement of status indicators 608 including a number of individual status indicators 612 configured to provide configuration and/or status information to a human observer. The exposed panel 602 further includes a group of reserved areas 604*a*, 604*b*, 604*c*, generally 604, which may be designated as reserved because they are unavailable to accommodate the arrangement of status indicators 608. One or more of the reserved areas 604 may be unavailable because it is occupied by another device, such as an electrical connector and/or an electromechanical port that would preclude positioning of a status indicator 612 there. Alternatively, or in addition, one or more of the reserved areas 604 may be unavailable because it is occupied by a vent, or ventilation panel as may be used for intake and/or exhaust cooling air flow. In at least some embodiments, one or more of the reserved areas 604 may be unavailable because it is occupied by a design element, such as a label and/or branding mark. According to the foregoing examples, unavailability is due to the existence of a structure that may be observable from an observer of the front panel 602.

It is conceivable that in at least some embodiments, unavailability may be duc to a condition occurring on an interior portion of the device 600, e.g., behind the front panel 602. Such conditions may include, without limitation, a location of an electrical, mechanical and/or electromechanical assembly, device and/or component within an interior region of the device 600 and proximate to an interior surface of the front panel 602. The condition may arise from a mechanical interference, e.g., insufficient room to accommodate the status indicator 612, and/or some other reason, such as a possibility of thermal interference and/or electrical interference, e.g., electromagnetic interference. It is understood that in such instances, the internal condition may not be visible by an observer of the front panel 602 but may nevertheless preclude positioning of a status indicator 612 there.

In at least some embodiments, the front panel 602 may include one or more exclusion regions that may be unavailable for reservation according to the example reserved areas 6046. It is understood that in at least some embodiments, a panel surface area may include one or more reserved areas and one or more unreserved areas, in which unreserved areas are so designated by their unavailability for serving as reserved arcas. By way of example, such exclusion regions may include at least a portion of a peripheral region of the front panel 602 as may be occupied by structural supports, e.g., for attachment to top, bottom and/or side panels, and/or internal structures such as mounting frames and/or printed circuit boards. The example front panel 602 includes a lower exclusion region 610 extending between a bottom perimeter of the front panel 602 and a bottom edge of the lower reserved areas 604. The lower exclusion region 610 may be unavailable for reservation due to the location of an adjacent edge of a PCB, e.g., a main PCB or motherboard. In is understood that in at least some embodiments, one or more of any identified exclusion regions, e.g., the lower exclusion region 610, may be available to accommodate one or more of the status indicators 612, despite being unavailable to accommodate a reserved area 604. Indeed, at least one strategy that supports maximizing reserved area(s) 604, while also providing status indicators 612, takes advantage of locating at least a portion of the status indicators within the exclusion regions.

Referring next to FIG. 6B, a section view is provided illustrating a front portion 650 of the example electronic device 600 illustrated in FIG. 6A in accordance with various aspects described herein. In particular, the section view is taken along line C-C' of FIG. 6A. An equipment chassis 654 is attached to a peripheral region of the front panel 602 as illustrated in part by upper and lower surfaces 656*a*, 656*b* of the equipment chassis 654. The electronic device 600 includes a main PCB 662, shown in partial cross section. The main PCB 662 is planar and arranged along a lower portion of the equipment chassis 654, e.g., extending from approximately an interior surface 653 of the front panel 602 towards a rear panel, not shown.

The illustrative embodiment includes a chassis module 658 extending from a top surface of the main PCB 662 to approximately an interior surface of the upper panel 656*a*. In at least some embodiments, the chassis module 658 is attached to a respective abutting surface of the main PCB 662, e.g., being mounted thereon according to a mechanical and/or electrical fastening mechanism. The fastening mechanism may include one or more of a mechanical fastener, such as a rivet, a screw, an interference fit, a pin-socket arrangement, a solder joint, a weld, a chemical fastener, e.g., an adhesive, such as a glue and/or an epoxy, and the like.

According to the illustrative embodiment, the chassis module 658 extends to and/or at least partially through an adjacent region of the front panel 602. Example chassis modules 658 include, without limitation, an electrical connector, a communication port, a heatsink and/or a vent. Accordingly, a reserved area 604*a* accommodates a corresponding portion of the chassis module 658.

The main PCB 662 defines a leading edge 663 arranged adjacent to a lower region of the interior surface 653 of the front panel 602. The leading edge 663 may be substantially close, e.g., in near intimate contact the interior surface 653 of the front panel 602 but allowing for a relatively small gap. It is understood that the gap may be somewhat exaggerated in size for illustrative purposes. Nevertheless, the gap may be sufficient to accommodate at least a portion of a status indicator assembly 664, also shown in cross section. In at least some embodiments, the status indicator assembly 664 includes a status indicator abutting and/or extending at least partially into the interior surface 653 of the front panel 602. The status indicator assembly 664 may be in communication with a status indicator controller (not shown), which may be located within the equipment chassis 654, e.g., on the main PCB 662. The status indicator controller may provide one or more control signals adapted to selectively actuate one or more of the status indicators 670. Alternatively, or in addition, the front panel 602 may include a transmission device 668, such as an acoustic and/or optical waveguide, configured to direct a status indication expressed by a status indicator 670 of the status indicator assembly 664 towards an exterior surface of the front panel 602, such that expression of the status indication may be perceptible by a human observer.

Figure 7B:
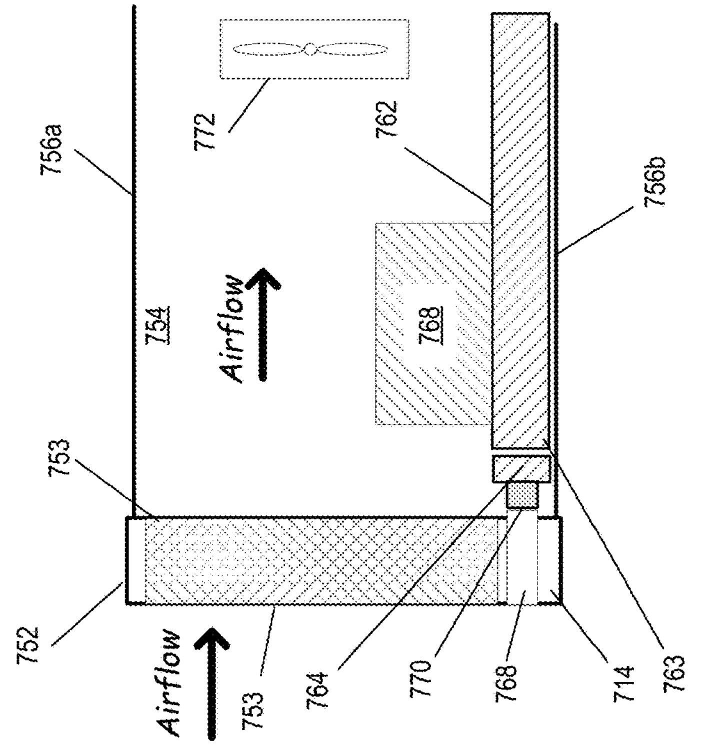
FIG. 7B is a section view illustrating a front portion of the example electronic device illustrated in FIG. 7A in accordance with various aspects described herein.
Figure 7A:
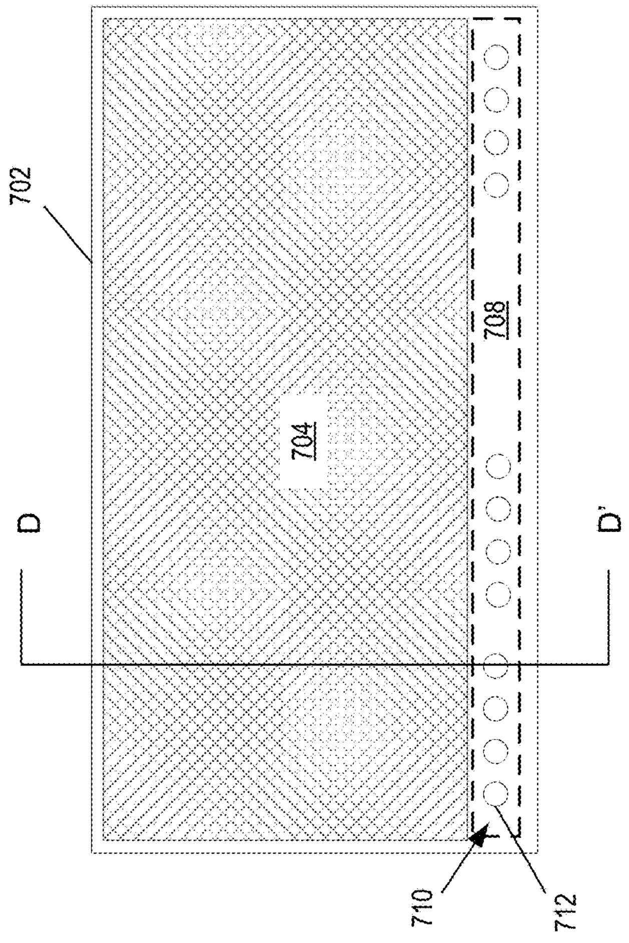
FIG. 7A is an elevation view illustrating a front panel of, yet another example electronic device equipped with space-saving visual indicators in accordance with various aspects described herein.

FIG. 7A is an elevation view illustrating a front panel of yet another example electronic device 700 equipped with space-saving visual indicators in accordance with various aspects described herein. The electronic device 700 includes a housing 754 (FIG. 7B) that includes an exposed panel 702 that may be positioned for observance by a human observer. The exposed panel 702 includes an arrangement of status indicators 708 including a number of individual status indicators 712 configured to provide configuration and/or status information to a human observer. The exposed panel 702 further includes a reserved area 704, which may be designated as reserved because it is unavailable to accommodate the arrangement of status indicators 708. One or more of the reserved areas 704 may be unavailable because it is occupied by a vent, or ventilation panel 753 (FIG. 7B) as may be used for intake and/or exhaust cooling air flow. According to the foregoing examples, unavailability may be due to the existence of a structure that may be observable from an observer of the front panel 702.

In at least some embodiments, the front panel 702 may include one or more exclusion regions that may be unavailable for reservation according to the example reserved areas 704. By way of example, such exclusion regions may include at least a portion of a peripheral region of the front panel 702 as may be occupied by structural supports, e.g., for attachment to top, bottom and/or side panels, and/or internal structures such as mounting frames and/or printed circuit boards. The example front panel 702 includes a lower exclusion region 710 extending between a bottom perimeter of the front panel 702 and a bottom edge of the lower reserved area 704. The lower exclusion region 710 may be unavailable for reservation due to the location of an adjacent edge of a PCB, e.g., a main PCB or motherboard. In is understood that in at least some embodiments, one or more of any identified exclusion regions, e.g., the lower exclusion region 710, may be available to accommodate one or more of the status indicators 712, despite being unavailable to accommodate the reserved area 704. Indeed, at least one strategy that supports maximizing reserved area 704, while also providing status indicators 712, takes advantage of locating at least a portion of the status indicators within the exclusion regions.

Referring next to FIG. 7B, a section view is provided illustrating a front portion 750 of the example electronic device illustrated in FIG. 7A in accordance with various aspects described herein. In particular, the section view is taken along line D-D' of FIG. 7A. An equipment chassis 754 is attached to a peripheral region of the front panel 702 as illustrated in part by upper and lower surfaces 756*a*, 756*b* of the equipment chassis 754. The electronic device 700 includes a main PCB 762, shown in partial cross section. The main PCB 762 is planar and arranged along a lower portion of the equipment chassis 754, e.g., extending from approximately an interior surface 753 of the front panel 702 towards a rear panel, not shown.

The illustrative embodiment includes a chassis module 768 attached to a top surface of the main PCB 762. In at least some embodiments, the chassis module 758 is attached to a respective abutting surface of the main PCB 762, e.g., being mounted thereon according to a mechanical and/or electrical fastening mechanism. The fastening mechanism may include one or more of a mechanical fastener, such as a rivet, a screw, an interference fit, a pin-socket arrangement, a solder joint, a weld, a chemical fastener, e.g., an adhesive, such as a glue and/or an epoxy, and the like.

According to the illustrative embodiment, the reserved area 704 includes a cooling vent 753. The device 700 also includes a cooling fan 772 adapted to move cooling air through the cooling vent 753. The cooling air may be adapted to provide thermal management for the device 700, e.g., for the chassis module 758.

The main PCB 762 defines a leading edge 763 arranged adjacent to a lower region of the interior surface 753 of the front panel 702. The leading edge 763 may be substantially close, e.g., in near intimate contact the interior surface 753 of the front panel 702 but allowing for a relatively small gap. It is understood that the gap may be somewhat exaggerated in size for illustrative purposes. Nevertheless, the gap may be sufficient to accommodate at least a portion of a status indicator assembly 764, also shown in cross section. In at least some embodiments, the status indicator assembly 764 includes a status indicator abutting and/or extending at least partially into the interior surface 753 of the front panel 702. The status indicator assembly 764 may be in communication with a status indicator controller (not shown), which may be located within the equipment chassis 754, e.g., on the main PCB 762. The status indicator controller may provide one or more control signals adapted to selectively actuate one or more of the status indicators 770. Alternatively, or in addition, the front panel 602 may include a transmission device 768, such as an acoustic and/or optical waveguide, configured to direct a status indication expressed by a status indicator 770 of the status indicator assembly 764 towards an exterior surface of the front panel 702, such that expression of the status indication may be perceptible by a human observer.

According to a space-saving configuration, an area allocated to any of the example status indicator assemblies is very limited. It is understood that in at least some embodiments, the status indicator assemblies include at least one electrical trace and/or circuit formed on and/or within a substrate material. Substrate materials may include any suitable substrate to support printed circuits, such as rigid materials, bendable materials, formable materials, flexible materials and/or foldable materials. In at least some embodiments, the substrate material may include substantially insulative properties so as not to interfere with operation of any electrical signals carried by the electrical circuits and/or traces. Alternatively, or in addition, in at least some embodiments, dimensions, e.g., thickness and/or material properties, e.g., dielectric constant, electrical conductivity, resistivity, permittivity, magnetic permeability, thermal conductance, and the like may be selected according to a design process for the status indicator assembly.

For example, space on an example sticker LED PCBA 506 (FIG. 5) to carry signals may be limited by the thickness of the main PCB 502 (FIG. 5), vertical spacing between a port and a surface of the main PCB 502, and so on. In one illustrative example, the LEDs 514 are tri-color LEDs, e.g., having separately controllable red, green and blue LED components. Continuing with the illustrative example, forty tri-color type LEDs would require at least 120 signals, one for each color dimension of each LED of the forty LEDs. In all likelihood, a power plane and/or a ground plane or signal return may also be required. Considering that each LED color dimension typically consumes about 10 Milliamperes (mA) when activated, a supporting status indicator circuit of one of the example sticker LED PCBAs 506 would be required to carry and/or otherwise supply a maximum current of about 1.2 Amps (A). Thus, a conventional approach would require 120 signals, e.g., 120 signal traces, and a power plane configured to supply up to 1.2 A of current.

It should be appreciated that a form factor of a flexible PCBA, such as the example sticker LED PCBA 506, may not be well suited for such high densities of control signals and/or operating currents. The illustrative embodiments disclose devices, processes and control software configured to reduce the number of signals and/or circuits and/or conductive PCB traces without compromising functionality. Namely, the same number of status indicators, e.g., LEDs, may be controlled to provide indications of status and/or configurations of each of the ports.

Figure 8:
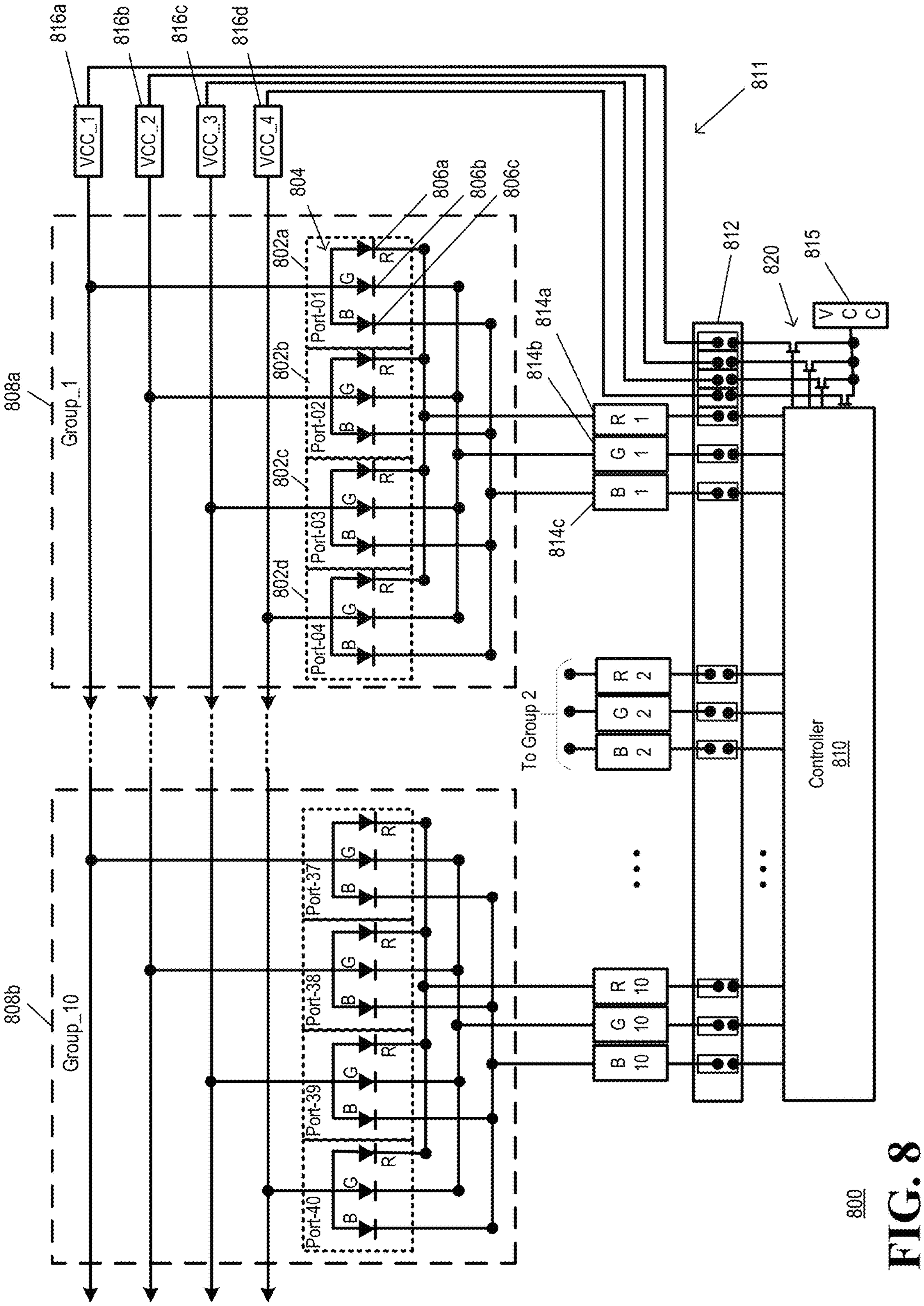
FIG. 8 is schematic diagram of an example status indicator system incorporating the example status indicator assembly of FIGS. 2A-2C in accordance with various aspects described herein.

FIG. 8 provides a schematic diagram of an example status indicator system 800 incorporating the example status indicator assembly of FIGS. 2A-2C in accordance with various aspects described herein. The status indicator system 800 includes a respective status indicator, e.g., an LED 804, for each of a number of ports, e.g., forty ports, referred to as Port_01, Port_02, . . . . Port_40. According to the illustrative example, each port includes a tri-colored LED 804. At least some of the example tri-colored LEDs 804 include a red LED 806*a*, a green LED 806*b* and a blue LED 808*c*. The LEDs 806*a*, 806*b*, 806*c*, generally 806, may be actuated independently to form a particular color of a range of colors. Actuation may include forward biasing a selected combination of the LEDs 806 with an operational voltage, e.g., VCC, having sufficient value to turn the selected combination of LEDs 806 on thereby providing illumination according to a specific color mix. By way of example, independent actuation of each of the independent red, green, blue LEDs 806 provides the corresponding red, green or blue color. However, actuation of a combination, such as the red and green LEDs 806*a*,80*b* may produce a color mix yielding the color yellow. Similarly, actuation of all three colors, red, green and blue may produce a color mix yielding the color white. Other color combinations are possible.

The example status indicator system 800 further includes a status indication controller 810 that may be configured to provide selective actuation of the LEDs of each port according to a predetermined status and/or configuration of that port. For example, and without limitation, the color white may indicate the corresponding port is configured for operation in an idle state, the color green may indicate transmit mode operation, yellow may indicate receive mode operation, and red may indicate an error status or failure.

The status indication controller 810 may be in communication with electrical conductors 811 of a cable harness and/or traces of a PCB, such as the example flexible PCBs disclosed herein. In at least some embodiments, one or more interconnections may be provided between the status indication controller 810 and the electrical conductors 811. The example status indicator system 800 includes a single, multi-contact connector 812 connecting inputs and/or outputs of the status indication controller 810 to respective ones of the electrical conductors 811. At least one operational voltage, e.g., VCC, may be provided by a power supply 815. It is understood that application of a positive voltage VCC to an anode terminal of any one of the LEDs 806, will turn the respective LED on when a circuit is completed through the LED 806.

The LEDs 804 are arranged according to multiple groups of ports. According to the illustrative example, a first group of ports 808*a* includes four ports, namely, Port_01, Port_02, Port_03, Port_04 802*a*, 802*b*, 802*d*, 802*c*, generally 802. The remainder of the forty ports may be arranged in groups in a like manner, resulting in a first group 808*a*, second group, and so forth, through a tenth group 808*b*. Each tri-colored LED 804 of the group may be in communication with a respective one of four actuation circuits, e.g., four VCC circuits 816*a*, 816*b*, 816*c*, 816*d*, generally 816. Each group 808 may be configured in a like manner, such that an application of any one of the VCC circuits 816, e.g., a first VCC circuit 816*a*, applies a first voltage VCC to the first tri-colored LED 804 of each of the ten groups of ports 808*a* through 808*b*, generally 808. It is understood that in at least some embodiments only one of the VCC circuits 816 may be active at any given time.

In at least some embodiments, the controller provides additional control signals to each of the groups of ports 808. For example, a first red control signal 814*a* is in communication with a cathode of each of the red LEDs 806*a* of each of the four tri-color LEDs 804 of the first group of ports 808*a*. Similarly, a first green control signal 814*b* is in communication with a cathode terminal of each of the green LEDs 806*b* of the four tri-color LEDs 804 of the first group of ports 808*a*, and a first blue control signal 814*c* is in communication with a cathode terminal of each of the blue LEDs 806*c* of the four tri-color LEDs 804 of the first group of ports 808*a*. Accordingly, actuation of one of the VCC circuits 816 selects one of the tri-color LEDs 804 associated with one of the ports of each of the multiple groups, e.g., ten tri-color LEDs 804 in a simultaneous manner. A particular color, or lack thereof may be controlled for the selected tri-color LED 804 according to control signals applied by the status indication controller 810 via the red, green and blue control signals 814*a*, 814*b*, 814*c*. In at least some embodiments, each of the different groups receives a respective combination of red, green and blue control signals for that group.

According to the illustrative embodiment, the status indicator system 800 divides a set of port LEDs, e.g., ports 1-40, into groups of four ports, with each LED of the four port LEDs sharing a common control signal lead to the status indication controller 810. The power signals, e.g., VCC_1 through VCC_4 may be driven by field effect transistors (FETs) 820. For example, the status indication controller 810 may provide a switching signal to one or more of the FETs 820, to turn the FETs 820 on selectively. When any of the FETs 820 are switched on, the power supply voltage, e.g., VCC, is applied to an interconnected power circuit 816. It is envisioned that in at least some embodiments, the FETs 820 may be driven in a repetitive manner, or frame as described further below.

Figure 9:
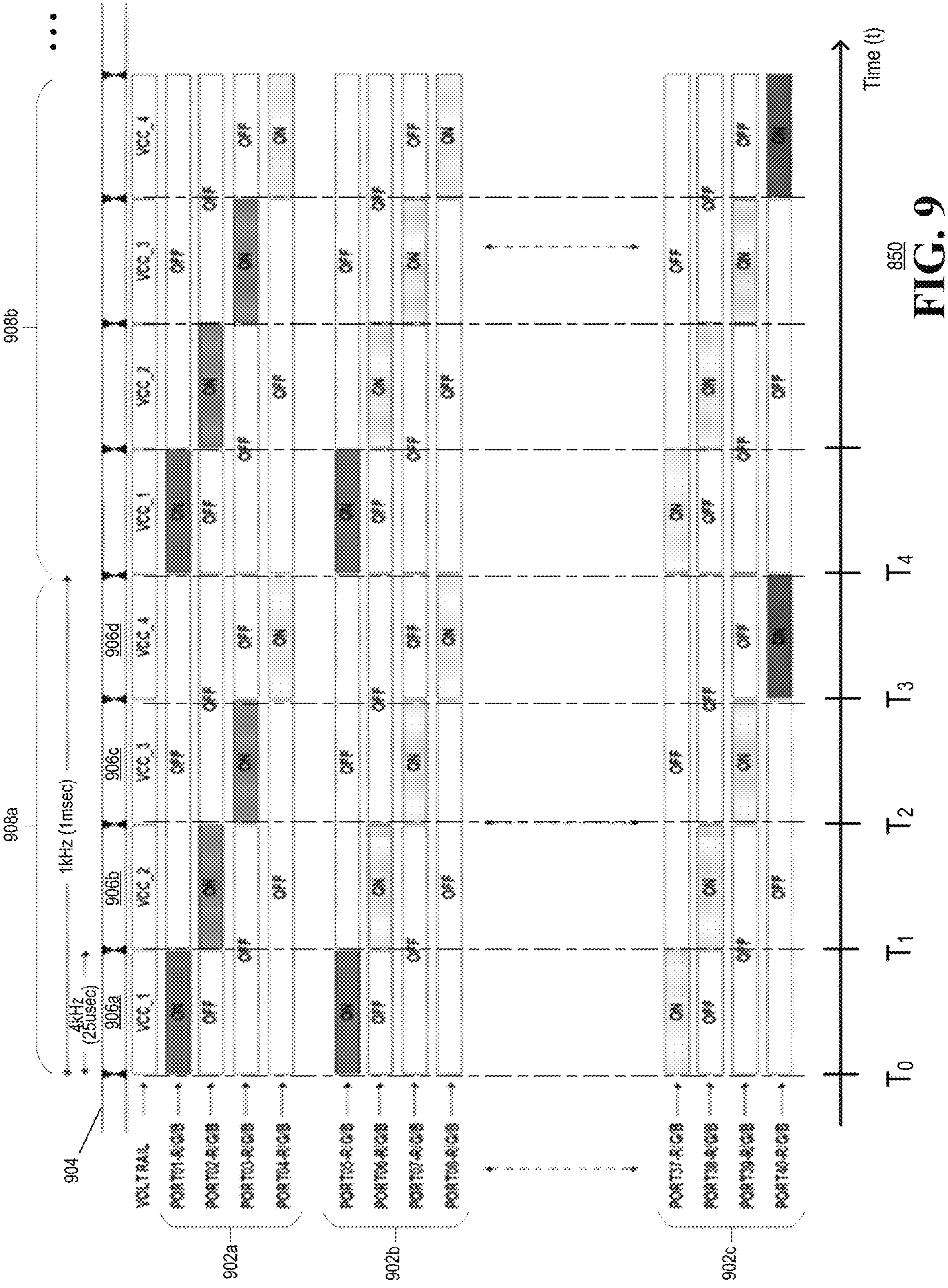
FIG. 9 is timing diagram of an example control signal of the example status indicator circuit of FIG. 8 in accordance with various aspects described herein.

FIG. 9 illustrates a timing diagram 900 of example control signals of the example status indicator circuit 800 of FIG. 8 in accordance with various aspects described herein. A time axis T marks a reference time $T_0$ and measures out subsequent time intervals according to frames. The frames, referred to as port frames 906, are arranged sequentially along the timeline and numbered accordingly, with a first port frame 906*a* occupying a time interval $T_0 \leq t \leq T_1$, a second port frame 906*b* occupies a time interval $T_1 \leq t \leq T_2$, a third port frame 906*c* occupies a time interval $T_2 \leq t \leq T_3$ and a fourth port frame 906*c* occupies a time interval $T_3 \leq t \leq T_4$. According to a time division multiplexing scheme, each port frame is associated with a respective one of the power circuits 816 (FIG. 8).

In at least some embodiments, only one power circuit 816 is active during each port frame 906*a*, 906*b*, 906*c*, 906*d*, generally 906. The power circuits 816 may sequence according to a predetermined order. For example, during the first port frame 906*a* only the first power circuit 816*a* is active, referred to as VCC_1, while all of the other power circuits 816*b*, 816*c*, 816*d*, referred to as VCC_2, VCC_3 and VCC_4 are inactive, e.g., disabled. Once again, whether a particular power circuit 816 is active may be determined by control signals from the status indication controller 810 (FIG. 8) activating respective FETs 815. When VCC_1 power circuit 816*a* is enabled, the first port LED 804 (FIG. 8) of each group 808*a* through 808*b* is controlled via their respective LED control signals 814. All the other ports LEDs remain inactive, e.g., turned off as their supply, e.g., VCC, is disconnected or otherwise referred to as "off." Accordingly, when VCC_1 power circuit 816*a* is enabled, the control signals R1, G1 and B1 are applied as described above in relation to FIG. 8, to control the individual LEDs 806 of the tricolor LED 804 of the first port of each group, e.g., Port_1 802*a* of Group_1 808*a*. Likewise, during the first port frame 906*a*, a second group of control signals R2, G2 and B2 controls a tri-color LED of a first port of a second group, e.g., port5 (not shown), and so on for the other groups 808. The tri-color LEDs 804 for all other ports will be off during the first port frame 906*a*.

In next frame, e.g., a second port frame 906*b*, the second VCC_2 power circuit 816*b* is enabled. The first group of control signals R1, G1 and B1 are provided to control a tricolor LED of a second port of each group, e.g., Port_2 802*b* of Group_1 808*a*, the same second group of control signals R2, G2 and B2 controls are provided to control a tricolor LED of a second port of a second group, e.g., the tri-color LED of Port_6 LED and so on for each of the remaining groups. The status indication controller 810 may be adapted to apply respective control states for the groups of control signals R1, G1, B1, R2, G2, B2, etc., such that the tri-color LEDs of each port may be independently controlled.

The first sequence of port frames 906 may be grouped together according to a first port group frame 908*a*, in which port frames 906 are not repeated. A second sequence of port frames 906 may be grouped together according to a second port group frame 908*b*, in which, once again, port frames 906 are not repeated. In at least some embodiments, the port frames 906 of each of the sequential port group frames actuates the same ports according to the same sequence, e.g., representing a subsequent update of activation of a status indicator of a particular port. In this manner, the process may repeat indefinitely. It is understood that a particular indication of each status indicator, e.g., a particular color, may be controlled according to a condition of a corresponding port. Thus, if the port condition does not change, the same color may be expressed for that port during subsequent port group frames 908. However, if the port condition changes, an updated color may be expressed for that port according to the changed condition.

A duration of the port frame 906 may be selected according to a predetermined time interval during which the corresponding port would be activated, e.g., lighting an LED status indicator. A number of port frames in a port group frame 908 may be determined according to a circuit sharing scheme in which a total number of status indicators is divided into multiple groups, each having fewer indicators than the total. For example, a group of forty tri-color indicators may be subdivided into ten groups of four. Accordingly, each time a port frame is activated, a corresponding port of each group is activated simultaneously. Consider a first port of each of the ten groups of ports being activated during a first port frame 906*a*, while the second, third and fourth ports of each group remain inactive. Likewise, a second port of each of the ten groups of ports may be activated during a second port frame 906*b*, while the first, third and fourth ports of each group remain inactive. The process may continue in a similar manner until all ports of each group of ports have been activated, upon which time the process may repeat.

In this manner, the status indicator circuit 800 provides a signal control strategy for connecting a relatively large number of ports, e.g., forty optical ports, each port configured with a multi-input device, such as single tri-color LED, using substantially fewer circuits and/or conductive paths than total number of ports. Additionally, a power savings may be realized as each port LED is controlled for a fraction of time, e.g., every 1 msec. If a particular LED is to be turned on, it is on for 250 μSec and off for 750 usec. Consequently, the LED is operated according to an on-off rate, or a "blink" rate of 1,000 Hz. Other switching rates and/or duty cycles are possible, with an understanding that the switching rates and/or duty cycles should be sufficiently fast and/or of sufficient duration such that any on-off flickering remains imperceptible to the human eye. It is understood that the human eye may be unable to distinguish switching or blink rates of 25 Hz or greater. Accordingly, LED switching rates at or above about 25 Hz should appear to the human eye as though the LEDs remain on.

It is understood that numbers of ports, sizes of groups, duration of group frames, and so on may be determined according to design criteria. Example design criteria may include, without limitation, physical circuit constraints, e.g., maximum number of signal leads, power leads and/or power planes, numbers of PCB layers, equipment panel area sizes, equipment panel reserved area constraints, equipment area exclusion area constraints, power requirements, maximum flicker rates, and so on.

Table 1 provides a comparison with respect to input/output count required on a status indicator PCB assembly and/or connector. Table 1 also provides an example comparison of LED power consumption for a conventional approach versus the example time division multiplexing scheme of the foregoing example.

TABLE 1

Comparison of Time Division Multiplexing to Traditional Approach.

| Details | Conventional Scheme | Proposed Scheme | Advantage of proposed scheme |
|---|---|---|---|
| Digital Signals | 40 × 3 = 120 | 3 × 10 = 30 | — |
| Max Current* Requirement | 40 × 3 × 10 mA = 1200 mA | 3 × 10 × 10 mA = 300 mA | — |
| Average Power consumption (V × I) | 3.3 × 1200 = 3.96 W | 3.3 × 300 = 0.99 W | Considering 3.3 V supply. Power saving = 75% |
| Power Contact | 3 | 4 | — |
| Total IO Count (Digital + Power) | 120 + 3 = 123 | 30 + 4 = 34 | IO Count reduction by = 72.35% |

A maximum current requirement referred to in Table 1, may be determined according to a situation in which all the ports tri colors LEDs are activated or glowed, and each LED is sinking about 10 mA of current. The example signal reduction techniques may be implemented to drastically reduce a number of signals required to activate or otherwise light LEDs in different colors as per the desired color coding for the corresponding ports, e.g., the example optical ports.

By way of example, the status indicator control signal values and timing aspects may represented in a matrix according to the timing diagram 900. The LEDs may be activated and/or otherwise glowed, with columns of four separate power rails (VCC) 816 (FIG. 8) and four rows of sharing LED control signals. The various different column and row signals may be controlled in a time-division-multiplexing (TDM) manner. This process may be repeated at a sufficiently high frequency to avoid human eye perceiving blinking of LEDs. Such a time division signal sharing allows for fewer control signals and/or power planes, which is beneficial to reduce size and/or power requirements of the status indicator PCB assembly, e.g., requiring fewer PCB layers, narrower conductive traces, and so on.

According to the illustrative example, the overall power consumption of the LED circuit design may be reduced by a factor of four, requiring only about 25% of what would have otherwise been required for full, independent LED control without. Beneficially, resulting reductions in the size requirement, circuit complexity and power may be accomplished without sacrificing visual signal quality of the LEDs.

The techniques disclosed here provide space-saving status indicator circuits capable of operating large numbers of status indicator elements, such as LEDs, with shared power and/or LED control leads. The resulting status indicator assemblies may be used individually and/or in any combination for a particular electronic device. Solutions using multiple status indicator assemblies may use different size and/or shaped status indicator assemblies that may be configured to control the same and/or different numbers of status indicator elements. In at least some embodiments, similar and/or identical status indicator assemblies may be used to control different groups of status indicators, e.g., according to the left-right example illustrated in FIG. 5. In at least some embodiments, the reduced size and/or power requirements allows for placement in areas that might otherwise be excluded and/or unavailable, such as along the edges of internal devices, such as the example main PCBs. The example status indicator assemblies may be combined with simple attachment facilitating feature, mechanism and/or device, such as adhesives and/or magnets to permit the status indicator assemblies to be placed in permanent and/or removable manner, as in the illustrative example in which a flexible LED PCBA is combined with an adhesive back, facilitating attachment of the assembly across the thickness of a main board PCB. In this manner, the LED PCBA may be assembled close to an interior surface of the faceplate.

In at least some embodiments, an equipment panel or faceplate may incorporate openings, e.g., holes, through which a transmission device, such as a light pipe, may be routed, e.g., press fitted. Such arrangements places one end of a light pipe very close to a status indicator LED, while an opposing end of the light pipe is exposed along the equipment panel for external observation. Use of transmission devices, such as the example light pipes helps to prevent interference, e.g., color bleeding, that might otherwise be experienced from adjacent status indicators, e.g., LEDs. Beneficially, this approach minimizes requirements for additional space and/or does not occupy any additional space on a panel of an equipment enclosure. For example, the light pipes may include columns directing light perpendicularly from the LED to an exposed surface of the front panel. Such approaches facilitate maximum openings on the equipment panel for air inlet and/or exit to cool high power devices, such as the example optical network ports.

Figure 10:
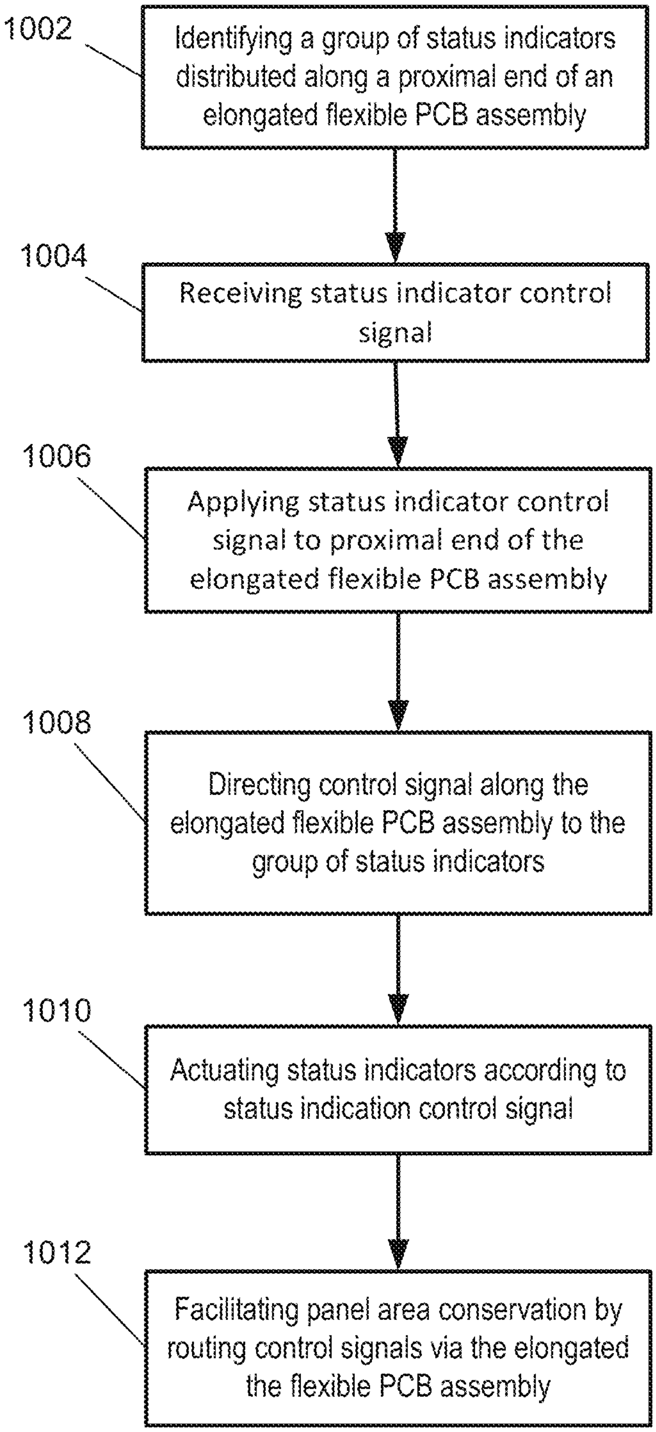
FIG. 10 depicts an illustrative embodiment of an equipment status indication process in accordance with various aspects described herein.

FIG. 10 depicts an illustrative embodiment of an equipment status indication process 1000 in accordance with various aspects described herein. The process 1000 facilitates operation of up to a substantial number of status indicators, e.g., LEDs, in a space-conserving manner. According to the examples provided herein, such a process conserves a significant amount of front panel space and/or internal space of a corresponding equipment housing that may be allocated to other purposes, such as cable interconnects, operator controls and/or cooling.

According to the example process, a group of status indicators distributed along a proximal end of an elongated flexible PCB assembly is identified at 1002. Identification may include one or more of identifying a number of status indicators, a type and/or types of status indicators, a location of the status indicators, a grouping of the status indicators, and so on. Groupings may include division of a total number of panel status indicators into different groups serviced by respective elongated flexible PCB assemblies. As in the example of FIG. 5, a total number of eighty LEDs 514 is divided into two groups supported by two flexible PCB assemblies 506*a*, 506*b*.

A status indicator control signal may be received at 1004. Status indicator control signals may include one or more of an activation or actuation signal that may operate to selectively turn a status indicator on or off. A nonlimiting example includes the selective application of VCC to one of a number of subgroups of LEDs via the frames 906. Alternatively, or in addition, the status indicator control signal may include a status indicator configuration control. A status indicator configuration control may include one or more of a color, an intensity, e.g., of the example tri-color LEDs and/or other status indicator features, such as a size, a shape, a tone, a volume, and so on.

In at least some embodiments, the status indicator control signal may be applied, at 1006, to proximal end of the elongated flexible PCB assembly. According to the illustrative example, a status indicator controller 520 generates the status control signal and applies the signal to a proximal electrical interconnect, e.g., a connector 516*a*, of the example elongated flexible PCB assembly 506*a*. The applied control signals are directed, in turn, at 1008 along the elongated flexible PCB assembly to the group of status indicators. The status indicators may be actuated, at 1010, according to status indication control signal. Beneficially, panel area may be conserved at 1012 by routing control signals via the elongated the flexible PCB assembly to panel space that might not otherwise be available for allocation to other front panel uses, such as cable interconnects, operator controls and/or cooling.

Figure 11:
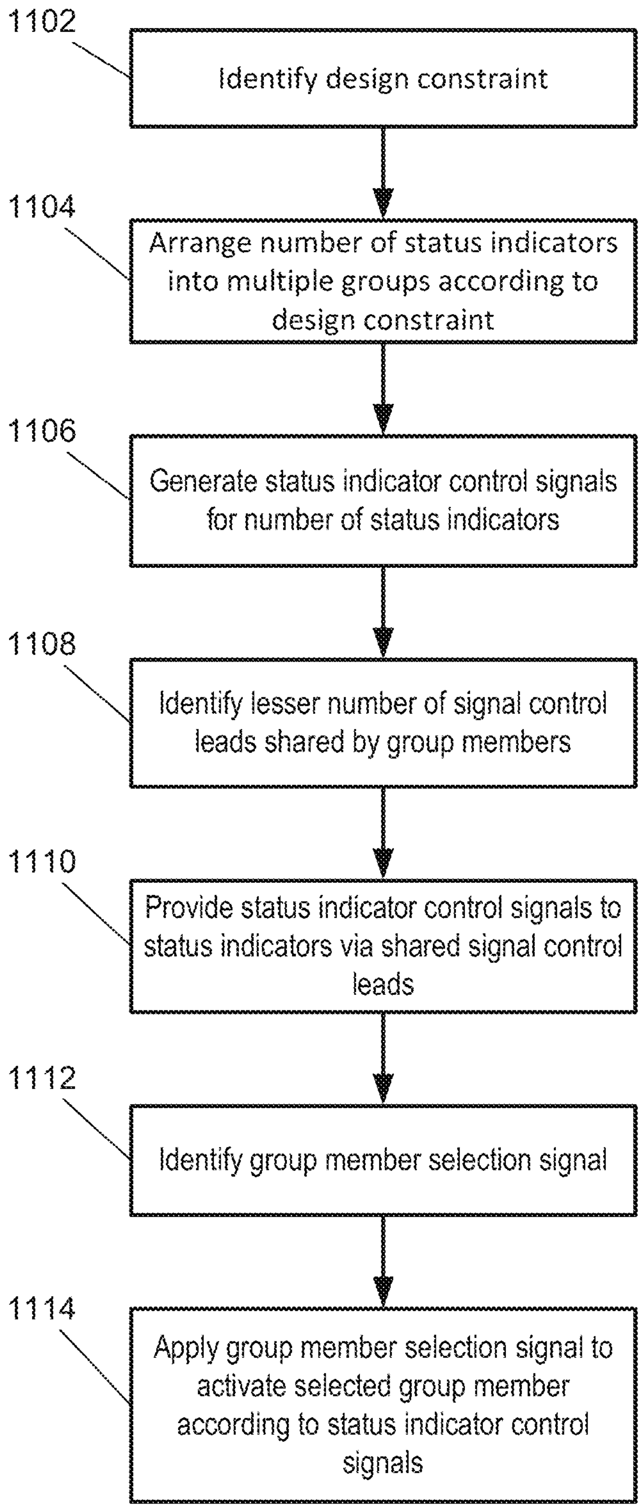
FIG. 11 depicts an illustrative embodiment of an equipment status indication control process in accordance with various aspects described herein.

FIG. 11 depicts an illustrative embodiment of an equipment status indication control process 1100 in accordance with various aspects described herein. According to the example process 100, one or more design constraints are identified at 1102. Example design constraints may include, without limitation, one or more of panel space of an equipment enclosure available to status indicators, maximum number of layers and/or available circuit routing width and/or area of a multi-layer PCB, such as the example flexible status indicator assemblies 200, 506 (FIGS. 2A and 5) disclosed herein, maximum permissible thermal load, shape constraints, such as a maximum elongated PCB width, a PCB width to length ratio, a minimum bend radius, numbers and/or types of status indicators, spatial multiplexing for placement of status indicators, e.g., splitting a total number of status indicators into multiple status indicator sub-groups supported on multiple flexible PCBs of an equipment panel, such as the first and second (left and right) status indicator assemblies 506, electrical requirements, e.g., maximum voltage and/or currents, and so on.

Continuing with the example process 1100, a total number of status indicators may be divided at 1104 into multiple groups according to design constraint. For example, a large number of status indicators may be subdivided and/or otherwise grouped into multiple smaller groups that may be individually operated and/or controlled, e.g., in a sequential and/or simultaneous arrangement.

Status indicator control signals are generated, at 1106, for number of status indicators. Status indicator control signals may include one or more of an activation or actuation signal that may operate to selectively turn a status indicator on or off. A nonlimiting example includes the selective application of VCC to one of a number of subgroups of LEDs via the frames 906. Alternatively, or in addition, the status indicator control signal may include a status indicator configuration control. A status indicator configuration control may include one or more of a color, an intensity, e.g., of the example tri-color LEDs and/or other status indicator features, such as a size, a shape, a tone, a volume, and so on.

A lesser number of signal control leads is identified, at 1108, to be shared by group members. For example, a signal sharing technique, such as a multiplexing arrangement may be used for control. Multiplexing may include one or more of temporal, frequency and/or spatial multiplexing to reduce a number of signal control leads and/or conductive traces for any given number of status indicators. Selection of the lesser number of signals may be determined, in at least some embodiments, according to one or more of the design constraints identified at 1102. For example, a total number of status indicators may be subdivided into multiple groups, with each group supported by a respective flexible PCB assembly according to a spatial multiplexing scheme. Alternatively, or in addition, a total number of status indicators of any given flexible PCB may be subdivided further into sub-groups that may be controlled according to a multiplexing scheme, e.g., a time division multiplexing (TDM) scheme, in which each group may be activated or lit within a respective time slot to the exclusion of other groups, which may remain un-activated or dark during that time slot. Each sub-group may have an assigned activation period that may be revisited periodically according to the TDM scheme. In at least some embodiments, a group revisit time of the TDM scheme may be selected according to a tolerable on/off blink rate of the status indicators. Accordingly, the number and/or size of the sub-groups and/or an extent of a multiplexing scheme may be determined according to a maximum number of status indicators and/or a tolerable blink rate.

Other considerations of sub-group size may include physical constraints. For example, if an elongated flexible PCB assembly is to be routed around an edge of a structure, such as the example main PCB 248 (FIG. 2C), a minimum bend radius may a function of the number of flexible PCB layers. Accordingly, in at least some embodiments, a minimum bend radius may be determined according to a space conserving constraint of front panel area. Namely, the lesser the bend radius, the greater the panel area is available to an access length of the main PCB 248. The minimum radius may then be used to determine a maximum number of flexible PCB layers may be permissible for a give flexible PCB assembly architecture. The number of flexible PCB layers may then be used to determine a maximum number of supportable status indicators, e.g., according to one or more multiplexing techniques as may be applied. The various interrelations of parameters may be solved in any suitable manner, including in optimal manners in which one or more of the parameters are identified for optimization, allowing the other parameters to be determined accordingly.

The status indicator control signals may be provided, at 1110, to status indicators via shared signal control leads. For at least some embodiments in which the status indicators are subdivided into smaller groups, e.g., individual network ports, and/or groups of ports, such as the example quad port pairs 406 (FIGS. 4A, 4B), a member selection signal may be identified, at 1112. The member selection signal may identify one or more of the subgroups and/or individual members of one or more sub groups, e.g., a first LED of each group of ports. Ultimately, the group member selection signal may be applied at 1114 to activate and/or otherwise control operation of selected group member according to status indicator control signals.

While for purposes of simplicity of explanation, the respective processes are shown and described as a series of blocks in FIGS. 10 and 11, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 12:
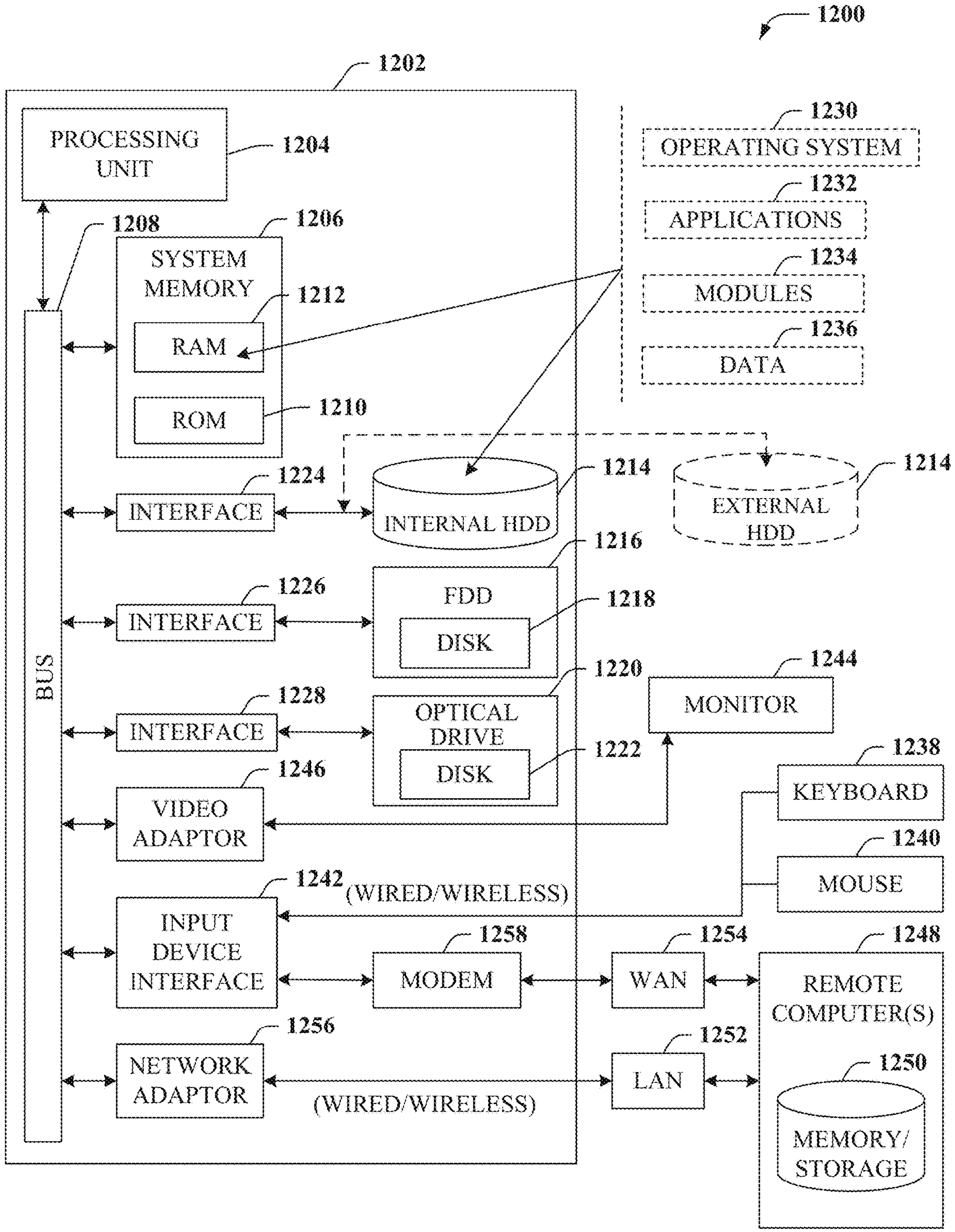
FIG. 12 is a block diagram of an example, non-limiting embodiment of a computing environment in accordance with various aspects described herein.

Turning now to FIG. 12, there is illustrated a block diagram of a computing environment 1200 in accordance with various aspects described herein. In order to provide additional context for various embodiments of the embodiments described herein, FIG. 12 and the following discussion are intended to provide a brief, general description of a suitable computing environment 1200 in which the various embodiments of the subject disclosure can be implemented. In particular, computing environment 1200 can be used in the implementation of the status indication controller 166, 520, 810 (FIGS. 1, 5 and 8). Each of these devices can be implemented via computer-executable instructions that can run on one or more computers, and/or in combination with other program modules and/or as a combination of hardware and software. For example, computing environment 1200 can facilitate in whole or in part providing status indication by way of control signals at a proximal end of an elongated flexible circuit assembly that includes a distal portion attached to and extending along at least a portion of an elongated, panel-facing edge of a planar circuit board. The control signals may apply a multiplexing technique to reduce a number of signal leads to accommodate a relatively large number of status indicators. In at least some embodiments. The control signals may be directed around a bent portion of the elongated flexible circuit assembly and to the status indicators, wherein at least a portion of the plurality of visual status indicators are actuated, responsive to the control signal, to provide a visual indication of a status of equipment supported by the planar circuit board. In at least some embodiments, the multiplexing technique may include a time division multiplexing technique, in which some status indicators are activated, while others are deactivated in an alternative fashion and at a rate that may be imperceptible to a human observer. Alternatively or in addition, the computing environment 1200 can facilitate optimization processes that may identify any combination of logical groups of status indicators, status indicator actuation duty cycles, refresh rates, power utilization, power savings, and so on.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment can comprise a computer 1202, the computer 1202 comprising a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multiprocessor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214 (e.g., EIDE, SATA), which internal HDD 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high-capacity optical media such as the DVD). The HDD 1214, magnetic FDD 1216 and optical disk drive 1220 can be connected to the system bus 1208 by a hard disk drive interface 1224, a magnetic disk drive interface 1226 and an optical drive interface 1228, respectively. The hard disk drive interface 1224 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can comprise a microphone, an infrared (IR) remote control, a joystick, a game pad, a stylus pen, touch screen or the like. These and other input devices are often connected to the processing unit 1204 through an input device interface 1242 that can be coupled to the system bus 1208, but can be connected by other interfaces, such as a parallel port, an IEEE 1394 serial port, a game port, a universal serial bus (USB) port, an IR interface, etc.

A monitor 1244 or other type of display device can be also connected to the system bus 1208 via an interface, such as a video adapter 1246. It will also be appreciated that in alternative embodiments, a monitor 1244 can also be any display device (e.g., another computer having a display, a smart phone, a tablet computer, etc.) for receiving display information associated with computer 1202 via any communication means, including via the Internet and cloud-based networks. In addition to the monitor 1244, a computer typically comprises other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a remote memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the LAN 1252 through a wired and/or wireless communication network interface or adapter 1256. The adapter 1256 can facilitate wired or wireless communication to the LAN 1252, which can also comprise a wireless AP disposed thereon for communicating with the adapter 1256.

When used in a WAN networking environment, the computer 1202 can comprise a modem 1258 or can be connected to a communications server on the WAN 1254 or has other means for establishing communications over the WAN 1254, such as by way of the Internet. The modem 1258, which can be internal or external and a wired or wireless device, can be connected to the system bus 1208 via the input device interface 1242. In a networked environment, program modules depicted relative to the computer 1202 or portions thereof, can be stored in the remote memory/storage device 1250. It will be appreciated that the network connections shown are example and other means of establishing a communications link between the computers can be used.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first." "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

Moreover, it will be noted that the disclosed subject matter can be practiced with various computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be in both local and remote memory storage devices.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass semiconductor devices, wafers, integrated circuits, circuit modules, modules, systems and/or components incorporating semiconductor devices, as well as a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature, or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all the features described with respect to an embodiment can also be utilized.

What is claimed is:

1. An equipment panel indicator assembly, comprising:

an elongated circuit board extending between a proximal end and a distal end, wherein the elongated circuit board comprises an electrical interface at the proximal end and an outer surface having a length dimension substantially greater than a width dimension;

a plurality of electrically actuated indicators arranged along the outer surface and distributed along at least a proximal portion of the length dimension, wherein the plurality of electrically actuated indicators comprises a sticker of light emitting diodes (LEDs);

a plurality of conductive traces extending between the electrical interface and at least a portion of the plurality of electrically actuated indicators; and a fastening mechanism positioned along at least a portion of an inner surface of the elongated circuit board, wherein the fastening mechanism is configured for attachment to an edge of a planar structure.

2. The equipment panel indicator assembly of claim 1, further comprising an electromechanical port.

3. The equipment panel indicator assembly of claim 1, further comprising ventilation equipment.

4. The equipment panel indicator assembly of claim 1, wherein the fastening mechanism comprises one of a removable fastener, a mechanical fastener, or a combination thereof.

5. The equipment panel indicator assembly of claim 1, comprising:

a first reserved area defined in part by the elongated circuit board and a first separation panel, wherein the first reserved area includes an electromechanical port; and a second reserved area defined in part by the elongated circuit board and the first separation panel, wherein the second reserved area includes a ventilation equipment.

6. The equipment panel indicator assembly of claim 1, wherein the planar structure comprises a printed circuit board and the fastening mechanism comprises an adhesive configured to attach the inner surface of at least a proximal portion of the elongated circuit board to an outer edge of the printed circuit board.

7. The equipment panel indicator assembly of claim 6, wherein the plurality of electrically actuated indicators comprises a plurality of light emitting diodes configured to emit, when actuated, light in an outward direction extending away from the outer edge of the printed circuit board.

8. The equipment panel indicator assembly of claim 1, wherein the elongated circuit board comprises a flexible printed circuit board.

9. The equipment panel indicator assembly of claim 8, wherein the planar structure comprises a front edge, a side edge and a corner therebetween, the corner defining a radial profile, and wherein the flexible printed circuit board is bendable, allowing a distal portion of the flexible printed circuit board to extend along an front edge of the planar structure and a proximal portion of the flexible printed circuit board to extend along a side edge of the planar structure, the flexible printed circuit board bendable around the corner.

10. The equipment panel indicator assembly of claim 9, wherein the flexible printed circuit board is bendable to a minimum radius, and wherein the radial profile of the corner conforms to the minimum radius.

11. A method for providing status indication, comprising:

receiving a control signal at a proximal end of an elongated flexible circuit assembly comprising a distal portion attached to and extending along at least a portion of an elongated, panel-facing edge of a planar circuit board; and directing the control signal to a plurality of visual status indicators distributed along at least a distal end of the elongated flexible circuit assembly, wherein a sticker of light emitting diodes (LEDs) is fastened across a thickness of the elongated flexible circuit assembly using adhesive, wherein the plurality of visual status indicators comprise the LEDs, wherein at least a portion of the plurality of visual status indicators is actuated, responsive to the control signal, to provide a visual indication of a status of equipment supported by the planar circuit board.

12. The method for providing status indication of claim 11, further comprising:

confining the distal portion of the elongated flexible circuit assembly between an inner surface of an equipment panel and the panel-facing edge; and directing an output of the visual status indicators through an outer surface of the equipment panel.

13. The method for providing status indication of claim 11, wherein the directing the control signal utilizes a plurality of conductive paths that is substantially fewer in number than the plurality of visual status indicators.

14. The method for providing status indication of claim 13, wherein the control signal comprises a multiplexing scheme allowing the plurality of conductive paths to provide different actuation signals to different groups of the plurality of visual status indicators.

15. The method for providing status indication of claim 14, wherein the multiplexing scheme comprises a time division multiplexing.

16. The method for providing status indication of claim 15, wherein a total number the plurality of conductive paths is less than half a total number of the plurality of visual status indicators.

17. The method for providing status indication of claim 15, wherein the visual status indicators comprise tri-color light emitting diodes, and wherein the visual status indicators emit controllable colors according to the control signal.

18. An electronic system, comprising:

a housing comprising an equipment panel observable by a human operator during operation;

a circuit board including a plurality of circuit devices attached thereon, wherein the circuit board is disposed within the housing, having an elongated edge extending along an interior surface of the equipment panel;

an elongated circuit assembly comprising an array of light emitting diodes extending along at least a distal portion of the elongated circuit assembly, wherein the elongated circuit assembly is attached to the circuit board, along the elongated edge such that the elongated circuit assembly is positioned between the elongated edge and the interior surface of the equipment panel; and a controller circuit configured to provide a status indicator control signal, wherein the controller circuit is in communication with the array of light emitting diodes via electrical traces of the elongated circuit assembly, the light emitting diodes actuated according to the status indicator control signal to provide a visual indication of a status of the plurality of circuit devices that is observable at the equipment panel.

19. The electronic system of claim 18, wherein the elongated circuit assembly comprises a flexible circuit assembly flexed around a corner of the circuit board, the corner adjoining the elongated edge to a side edge of the circuit board.

20. The electronic system of claim 18, wherein the status indicator control signal comprises a time division multiplexed signal configured to actuate a first number of the array of light emitting diodes utilizing a second number of electrical circuit traces, wherein the second number is less than the first number.

* * * * *